March 16, 1948.    T. J. WATSON ET AL    2,438,081
RECORD CONTROLLED ACCOUNTING MACHINE
Filed July 15, 1943    17 Sheets-Sheet 1

INVENTORS
THOMAS J. WATSON
HORACE S. BEATTIE
FREDERICK L. FULLER, DECEASED
BY J.G. PHILLIPS + S.B. HARRISON, EXECUTORS
BY
ATTORNEY.

March 16, 1948.  T. J. WATSON ET AL  2,438,081
RECORD CONTROLLED ACCOUNTING MACHINE
Filed July 15, 1943  17 Sheets-Sheet 2

INVENTORS
THOMAS J. WATSON
HORACE S. BEATTIE
FREDERICK L. FULLER, DECEASED
BY J.G. PHILLIPS + S.B. HARRISON, EXECUTORS
BY
ATTORNEY.

March 16, 1948.  T. J. WATSON ET AL  2,438,081
RECORD CONTROLLED ACCOUNTING MACHINE
Filed July 15, 1943  17 Sheets—Sheet 3

INVENTORS
THOMAS J. WATSON
HORACE S. BEATTIE
FREDERICK L. FULLER, DECEASED
BY J.G. PHILLIPS & S.B. HARRISON, EXECUTORS
ATTORNEY.

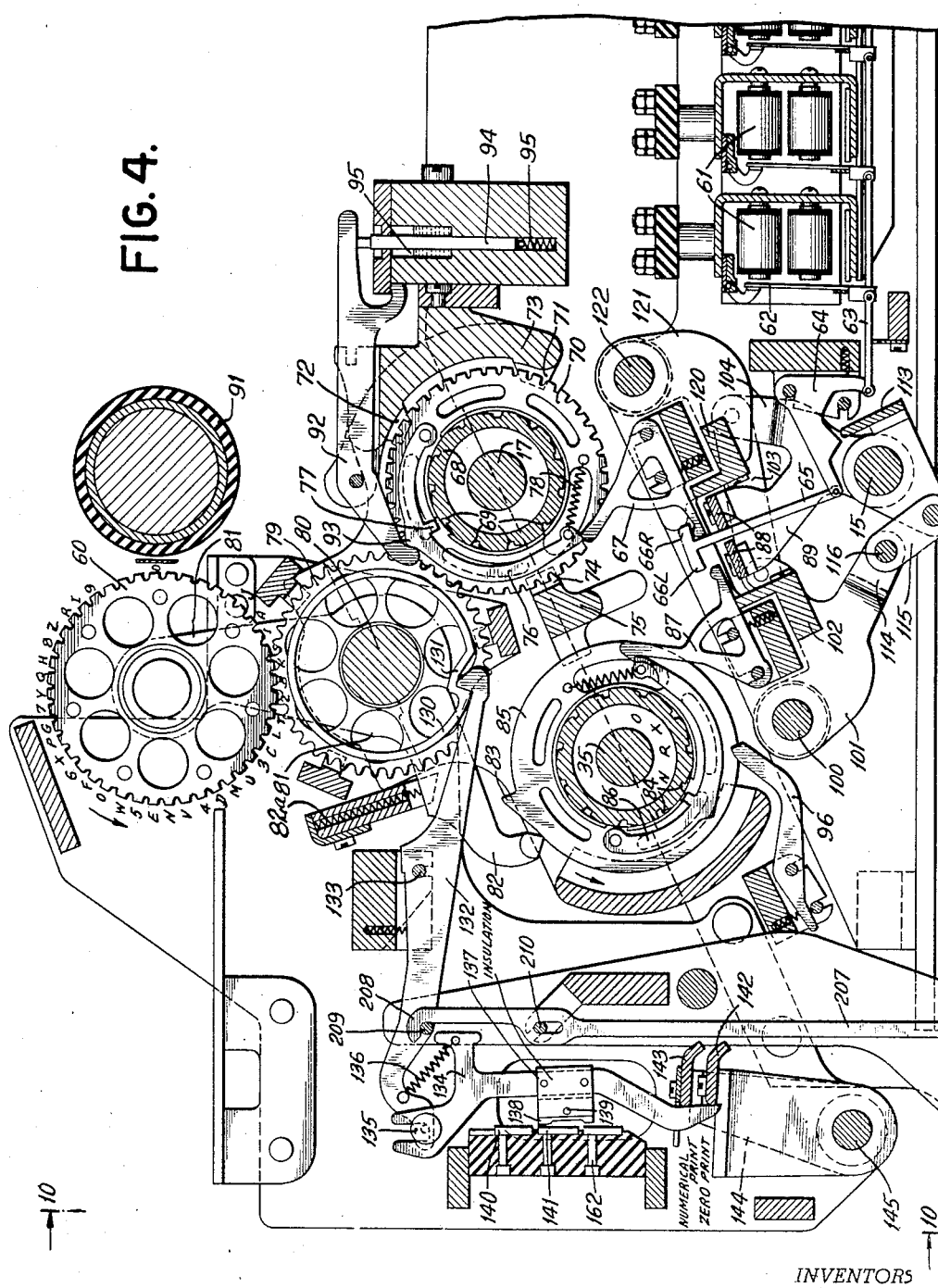

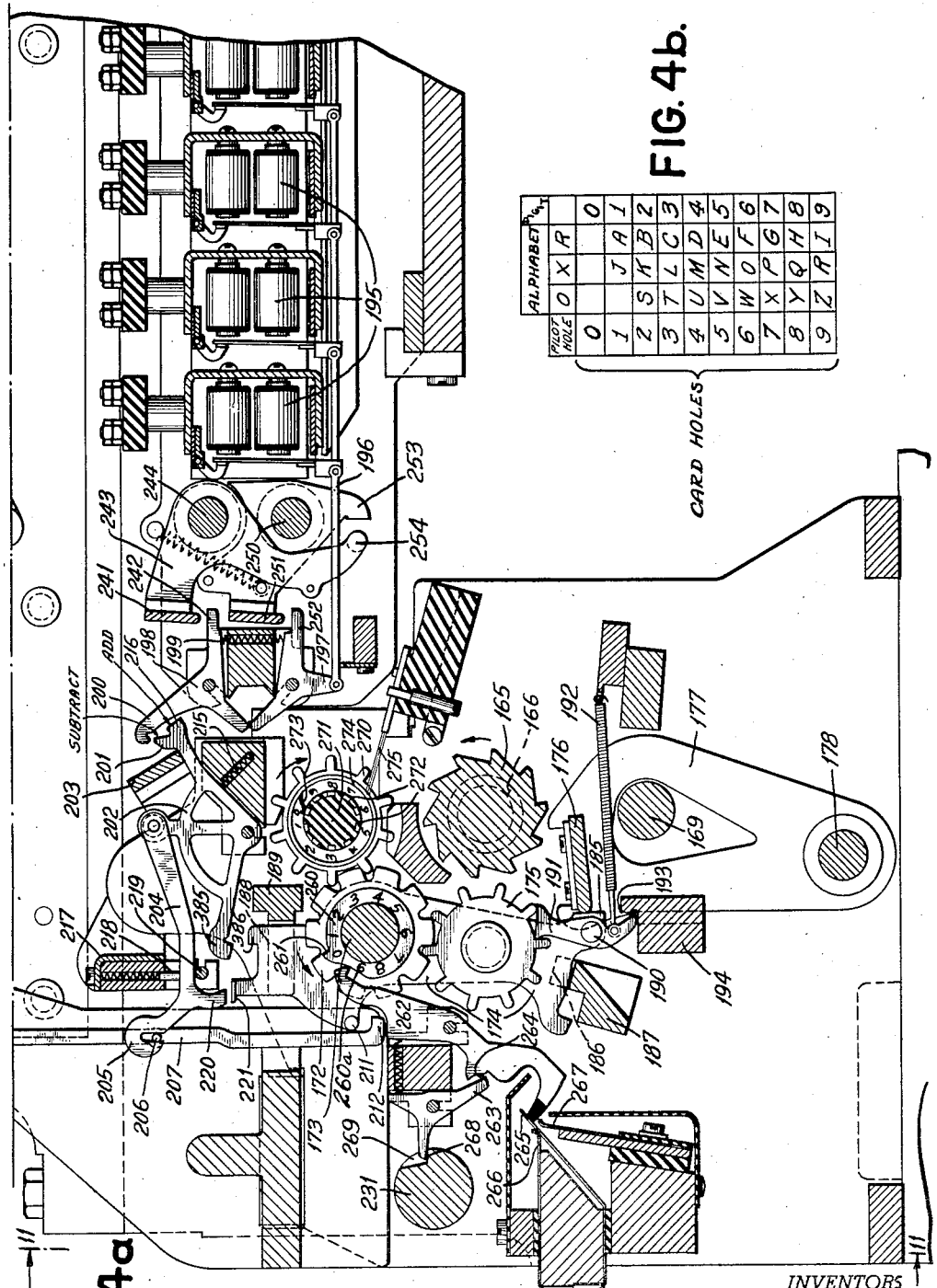

March 16, 1948.  T. J. WATSON ET AL  2,438,081
RECORD CONTROLLED ACCOUNTING MACHINE
Filed July 15, 1943  17 Sheets-Sheet 6
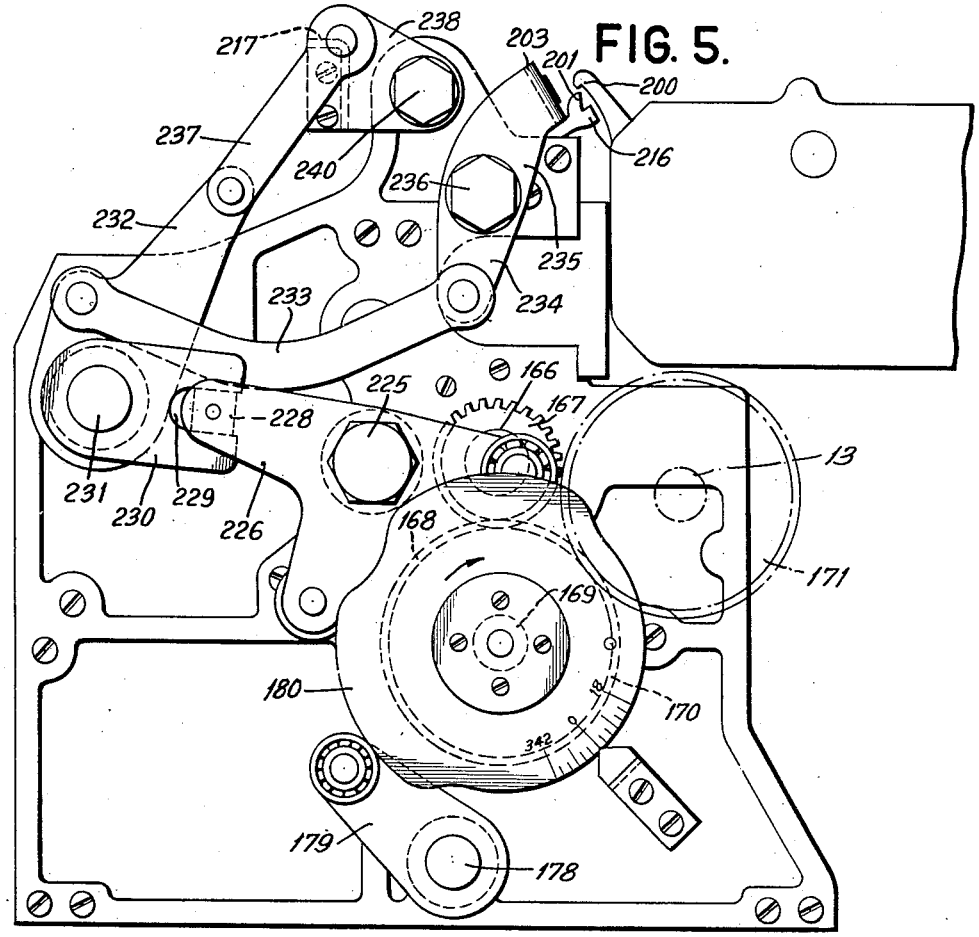
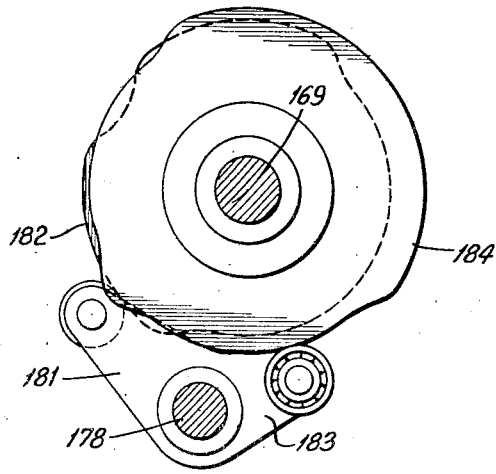
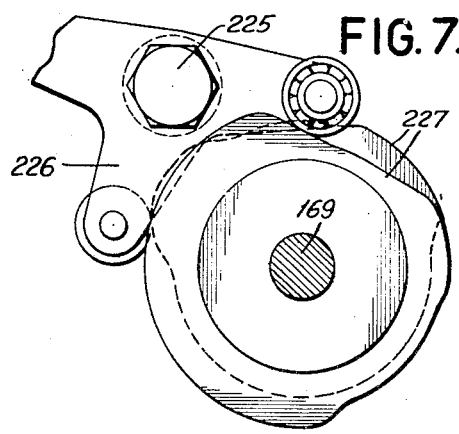
INVENTORS
THOMAS J. WATSON
HORACE S. BEATTIE
FREDERICK L. FULLER, DECEASED
BY J.G. PHILLIPS + S.B. HARRISON, EXECUTORS
ATTORNEY.

March 16, 1948. T. J. WATSON ET AL 2,438,081
RECORD CONTROLLED ACCOUNTING MACHINE
Filed July 15, 1943 17 Sheets-Sheet 7

INVENTORS
THOMAS J. WATSON
HORACE S. BEATTIE
FREDERICK L. FULLER, DECEASED
BY J. G. PHILLIPS & S. B. HARRISON,
EXECUTORS
ATTORNEY

March 16, 1948.   T. J. WATSON ET AL   2,438,081
RECORD CONTROLLED ACCOUNTING MACHINE
Filed July 15, 1943   17 Sheets-Sheet 8

INVENTORS
THOMAS J. WATSON
HORACE S. BEATTIE
FREDERICK L. FULLER, DECEASED
BY J. G. PHILLIPS & S. B. HARRISON, EXECUTORS
BY
ATTORNEY.

March 16, 1948.    T. J. WATSON ET AL    2,438,081
RECORD CONTROLLED ACCOUNTING MACHINE
Filed July 15, 1943    17 Sheets-Sheet 11

INVENTORS
THOMAS J. WATSON
HORACE S. BEATTIE
FREDERICK L. FULLER, DECEASED
BY J. G. PHILLIPS & S. B. HARRISON
EXECUTORS
ATTORNEY.

March 16, 1948.   T. J. WATSON ET AL   2,438,081
RECORD CONTROLLED ACCOUNTING MACHINE
Filed July 15, 1943   17 Sheets-Sheet 12

INVENTORS
THOMAS J. WATSON
HORACE S. BEATTIE
FREDERICK L. FULLER, DECEASED
BY J. G. PHILLIPS & S. B. HARRISON,
EXECUTORS
*[signature]* ATTORNEY.

March 16, 1948. T. J. WATSON ET AL 2,438,081
RECORD CONTROLLED ACCOUNTING MACHINE
Filed July 15, 1943 17 Sheets-Sheet 13

INVENTORS
THOMAS J. WATSON
HORACE S. BEATTIE
FREDERICK L. FULLER, DECEASED
BY J.G. PHILLIPS & S.B. HARRISON,
EXECUTORS
ATTORNEY.

March 16, 1948. T. J. WATSON ET AL 2,438,081
RECORD CONTROLLED ACCOUNTING MACHINE
Filed July 15, 1943 17 Sheets-Sheet 15

INVENTORS
THOMAS J. WATSON
HORACE S. BEATTIE
FREDERICK L. FULLER, DECEASED
BY J. G. PHILLIPS + S.B. HARRISON,
EXECUTORS
ATTORNEY

Patented Mar. 16, 1948

2,438,081

UNITED STATES PATENT OFFICE 2,438,081

RECORD CONTROLLED ACCOUNTING MACHINE

Thomas J. Watson, New Canaan, Conn., Horace S. Beattie, East Orange, N. J., and Frederick L. Fuller, deceased, late of West Orange, N. J., by Schuyler B. Harrison, East Orange, N. J., and John G. Phillips, New York, N. Y., executors, assignors to International Business Machines Corporation, New York, N. Y., a corporation of New York Application July 15, 1943, Serial No. 494,820

31 Claims. (Cl. 235—61.8)

This invention relates to accounting machines and more particularly to the type controlled by records and has for its main object the construction of a record controlled accounting machine which will carry out the functions required of a commercial machine by constructions which operate in a more efficient and novel manner. The constructions are devised particularly with the viewpoint of deriving the increased efficiency by adopting constructions which render available an increase in speed of accounting and at the same time insure accuracy in accounting and printing functions.

The present invention has for its object the coordination of an item accumulating mechanism with the record controlled alphabetic-numeric rotary printing mechanism shown in the patent to Fuller et al. No. 2,199,561 whereby in the attainment of this end additional functions are secured, namely, the entering of debit and credit items, listing of such items, and related totals, either as positive or negative balances, all of which functions are a cardinal requirement of modern commercial tabulating machines.

Of course, without accuracy in accounting operations such forms of machines would have no commercial value and the present accumulating functions have been devised from the aspect of insuring accurate accumulating operations by adopting constructions which are less likely to require service to insure continuous high speed accurate accounting operations.

One rigid requirement of all accounting machines is the requirement that correspondence be secured between the digit entered in an accumulator and printed and in the present arrangement the clutch which is engaged under record perforation control to initiate the setting of the printing element has a positive mechanical connection to the control member which determines the initiation or termination of the operation of the accumulating element, depending upon the type of entry to be effected.

Another object of the invention relates to the accumulating mechanism and its addition and subtraction control whereby a single accumulator receives additive and subtractive entries to arrive at a balance. Such controls operate in a facile and efficient manner, simplifying those previously devised and by their execution correct additive and subtractive entries are insured.

Another object of the invention relates to the total printing mechanism which normally prints a credit positive balance when the credit amounts numerically exceed the debit amounts and to the provision of novel means for converting the accumulator when a credit negative balance is detected to a digit representation which affords printing of the negative credit balance as a true number by the total printing mechanism.

Another object of the invention concerns the provision of a novel readout construction which is much simpler than heretofore and which stands at digit representations which are the tens complement of each digit of the related accumulator element. This digit relationship is particularly useful when additive and subtractive entries are effected in the novel manner to be hereinafter disclosed and particularly with the form of printing mechanism which selects a digit for printing by initiating the movement of the printing member to the selected digit position, rather than interrupting its movement when the selected type is at the printing line.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1a is an outline of a typical computation involving both debit and credit balances.

Figure 1:
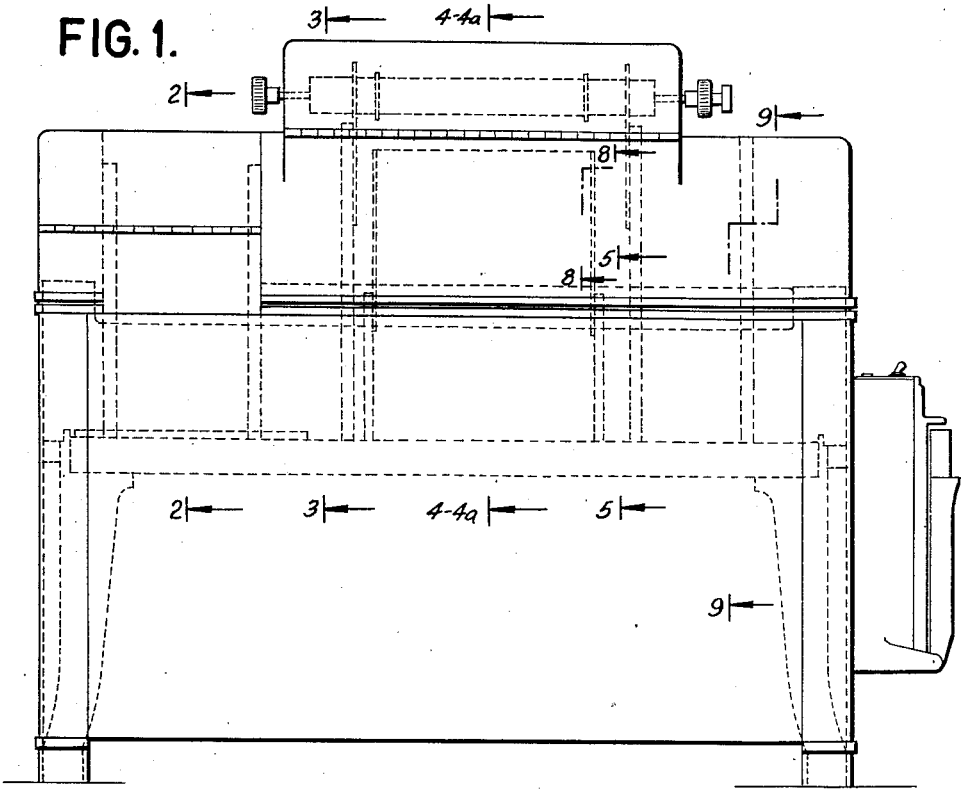
Fig. 1 is a front elevational view of the improved tabulating machine with section lines applied to indicate where the different sectional views of the drawings are taken.

Figs. 4 and 4a taken together with Fig. 4 on the top are sectional views taken on the lines 4—4 and 4a—4a of Fig. 1. Fig. 4 shows the construction of the combined numeric and alphabetic printing mechanism while Fig. 4a shows the construction of the accumulator mechanism and associated controls.

Fig. 4b is a diagram illustrating the alphabet and numeral characters selected by perforations appearing in a column, singly or in combination.

Fig. 5 is an end view taken on the line 5—5 of Fig. 1, showing particularly the operating mechanism for certain devices associated with the accumulator section of the machine.

Fig. 6 is a detail view showing the outline of a set of complementary cams.

Fig. 7 similarly is a detail view, showing the outline of other complementary driving cams of the machine.

Figure 8:
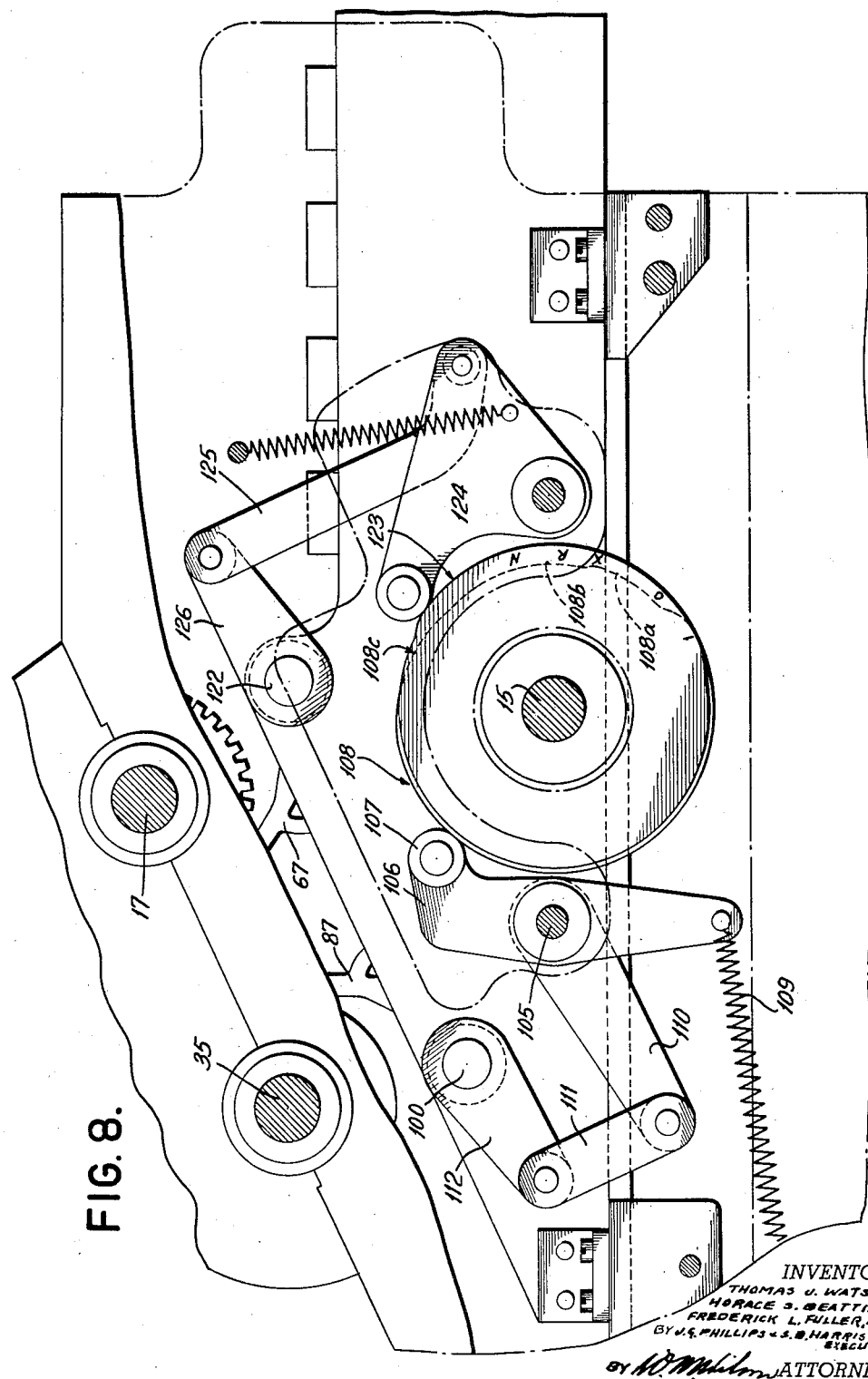

Fig. 8 is a sectional view taken on the irregular section line 8—8 of Fig. 1, showing some of the operating mechanism associated with the printing section of the machine.

Figure 9:
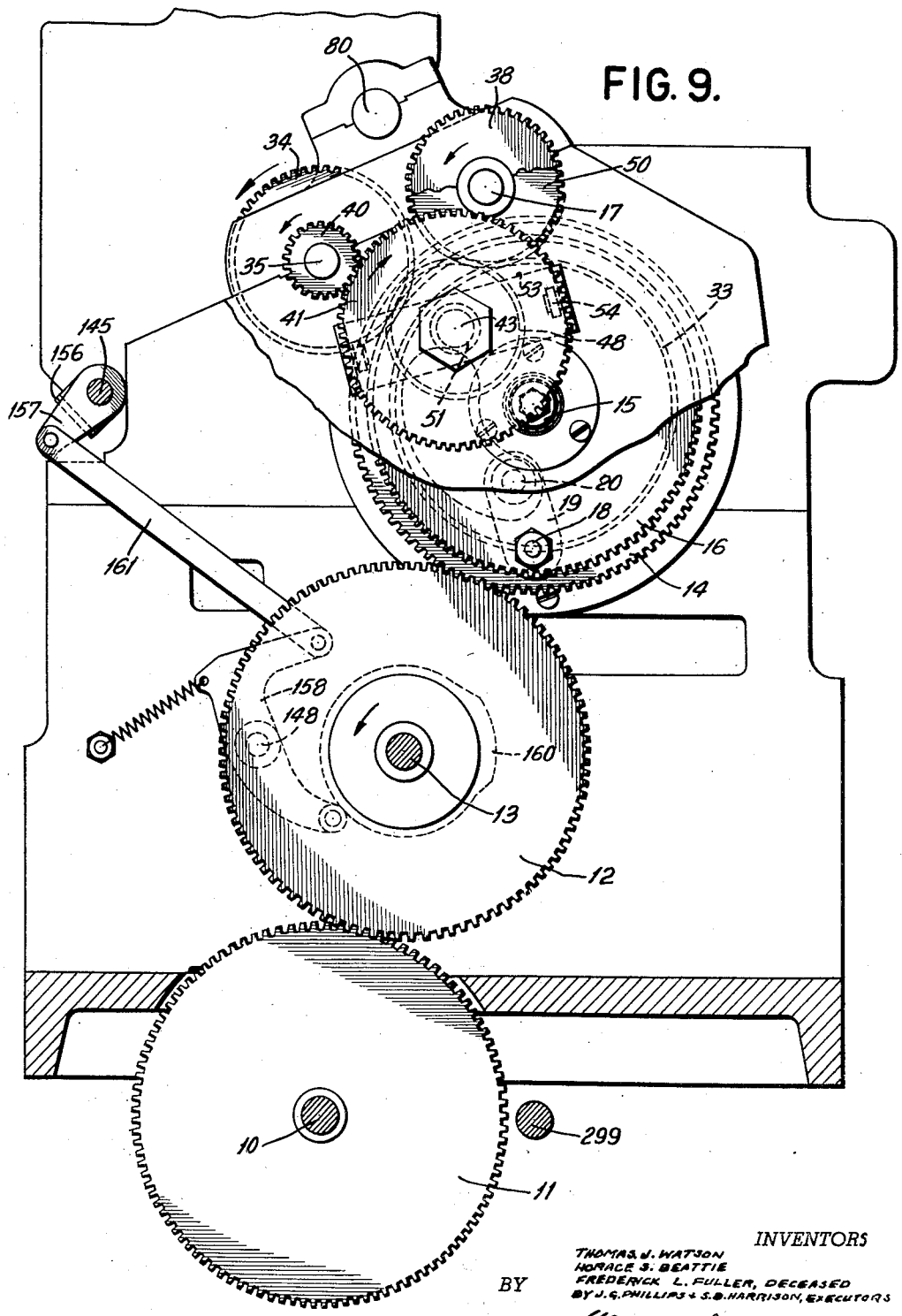

Fig. 9 is an end view taken near the right hand end of the machine and is taken on the line 9—9 of Fig. 1. This view shows the inter-related gearing mechanism for driving the main operating shafts of the machine.

Figure 10:
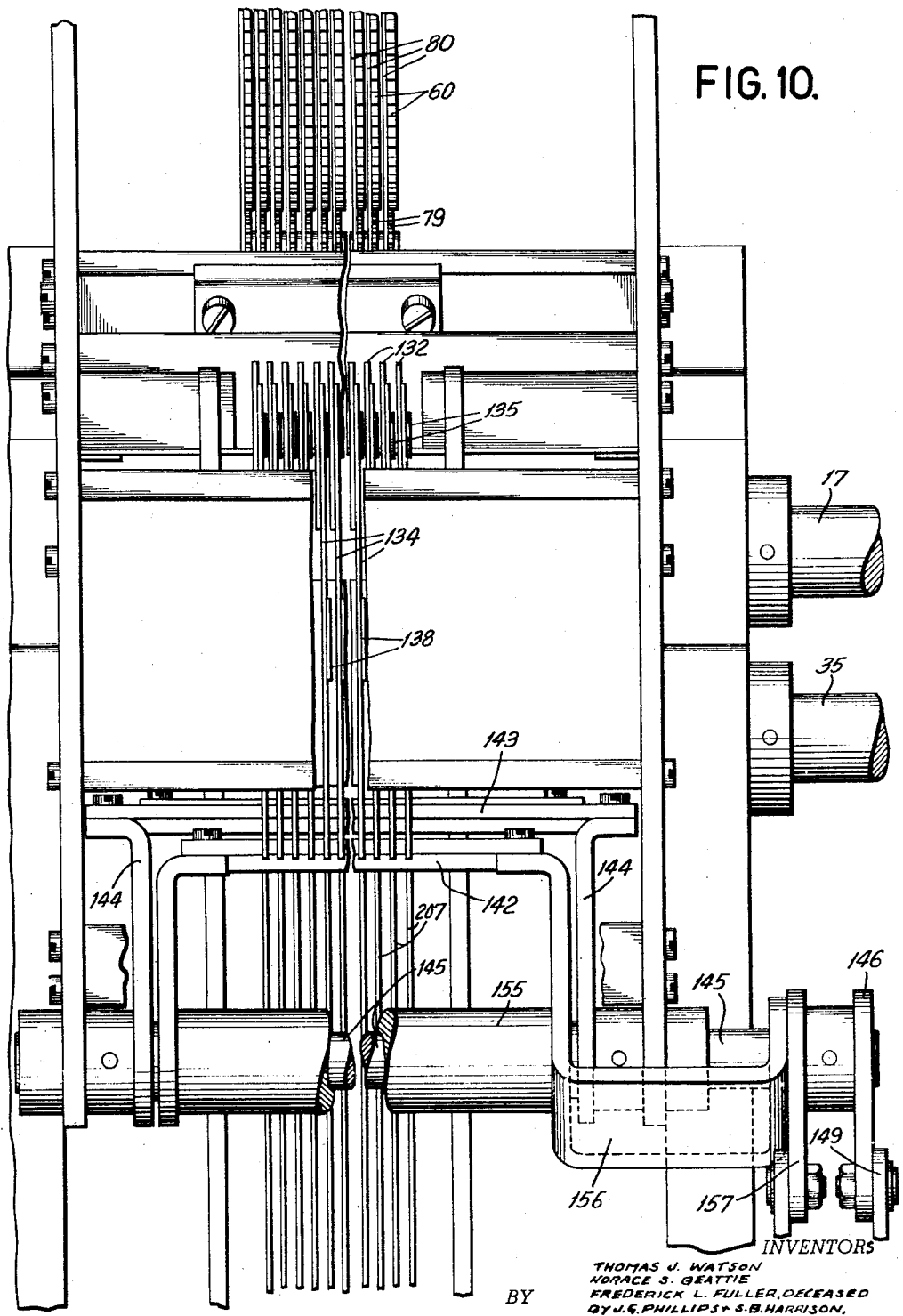

Fig. 10 is a front elevational view taken on the line 10—10 of Fig. 4.

Figure 11:
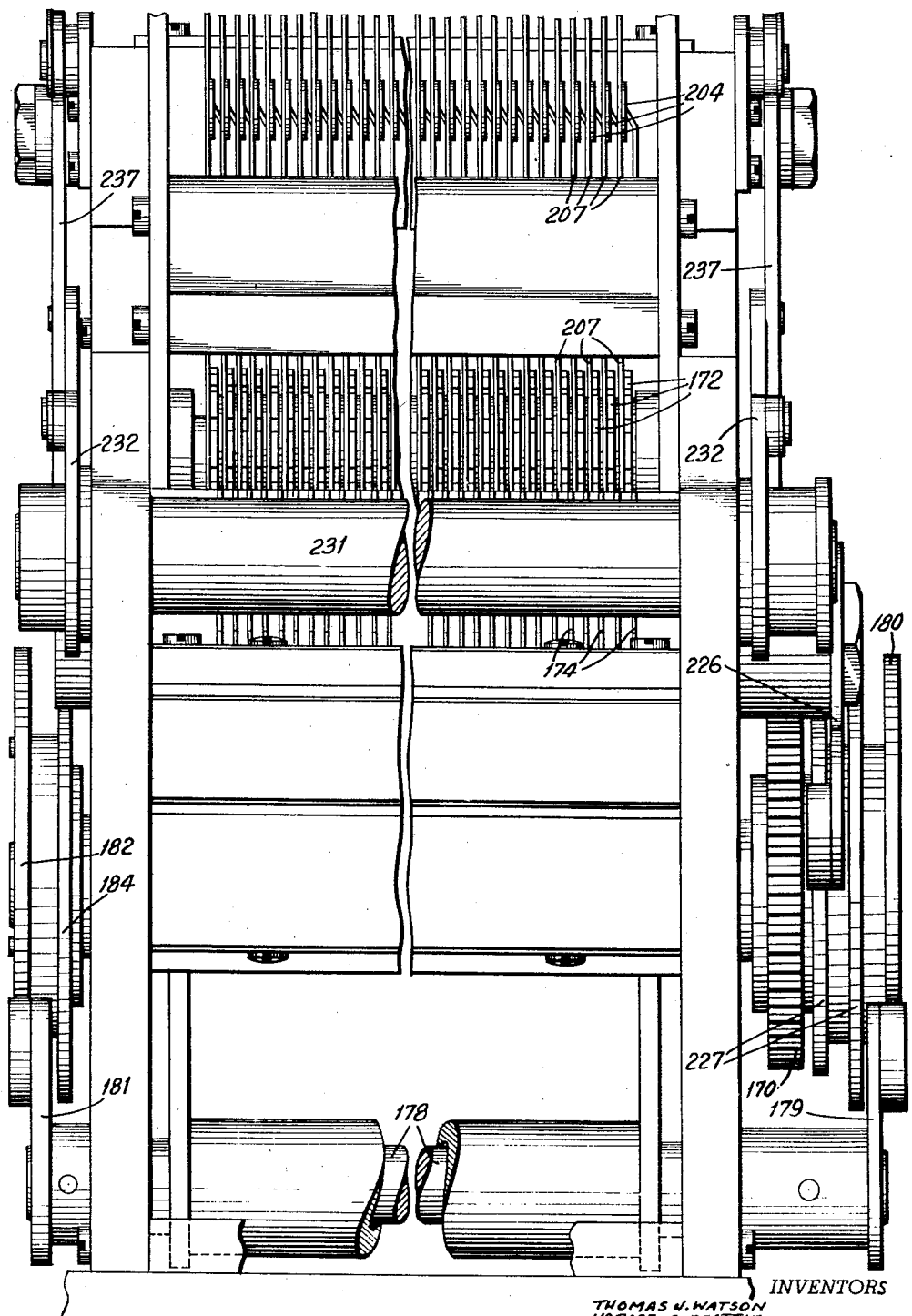

Fig. 11 is a front elevational view taken on the line 11—11 of Fig. 4a.

Figure 12:
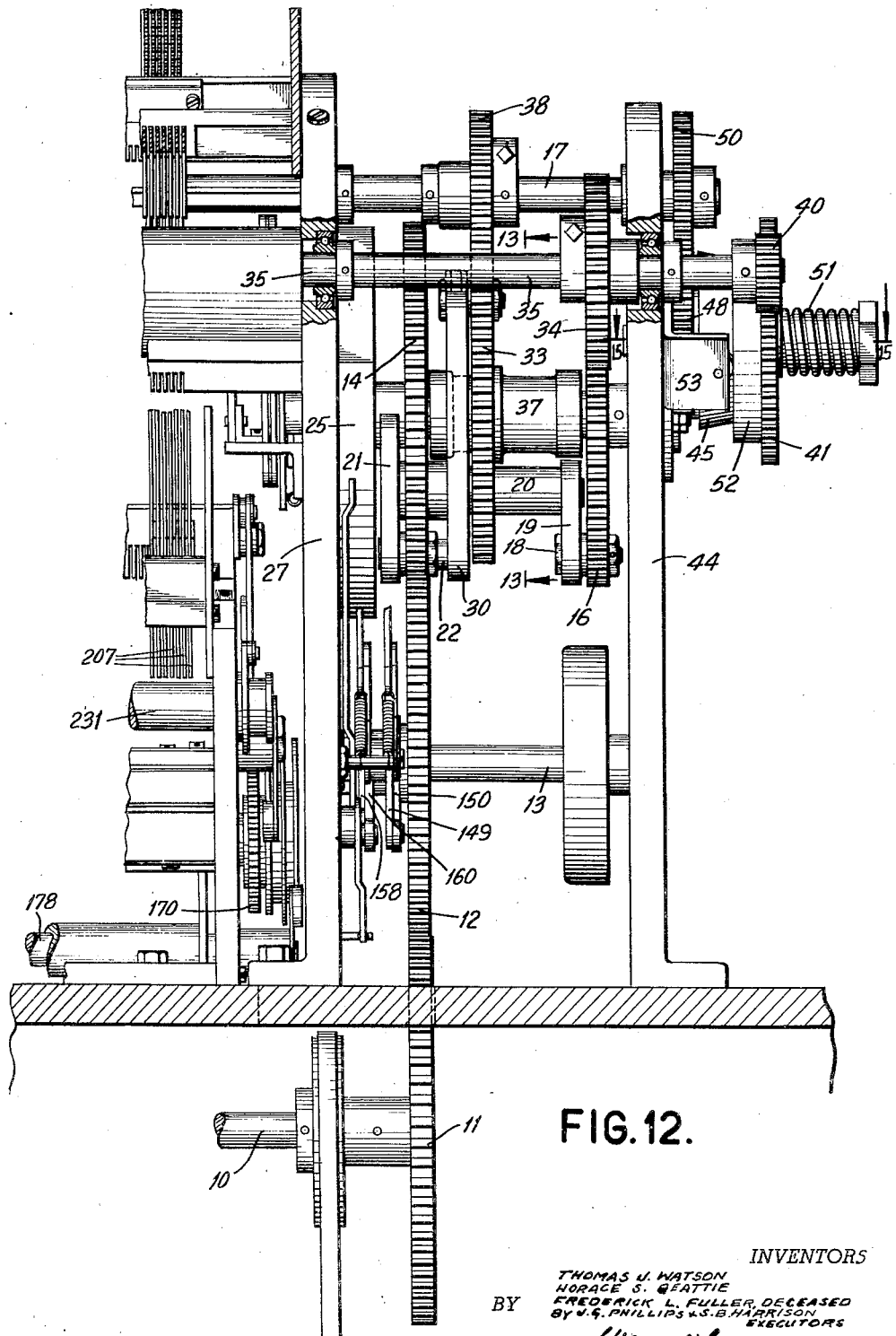

Fig. 12 is a front elevational view of the gear driving and variable gear transmission mechanism.

Figure 13:
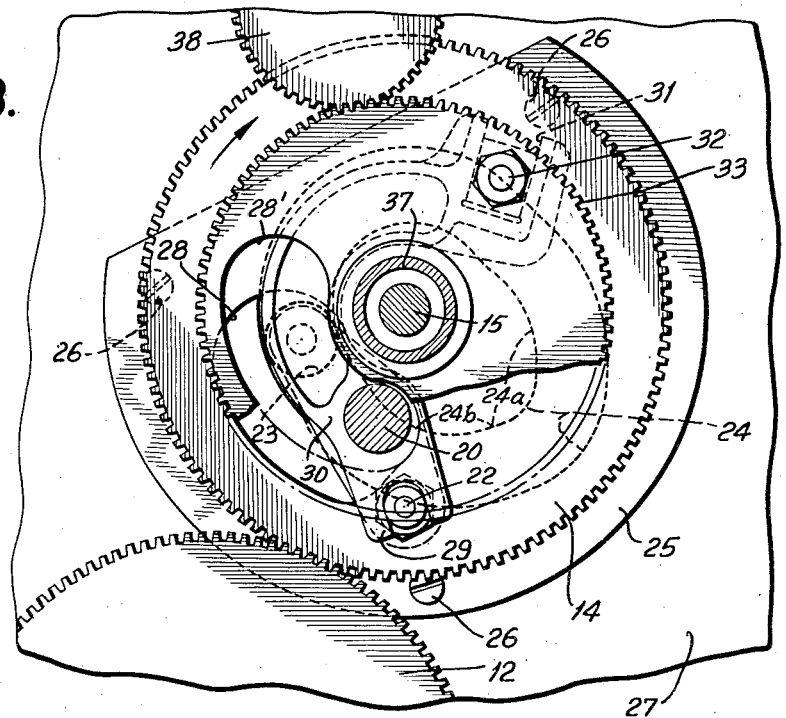

Fig. 13 is a sectional view taken on the line 13—13 of Fig. 12.

Figure 14:
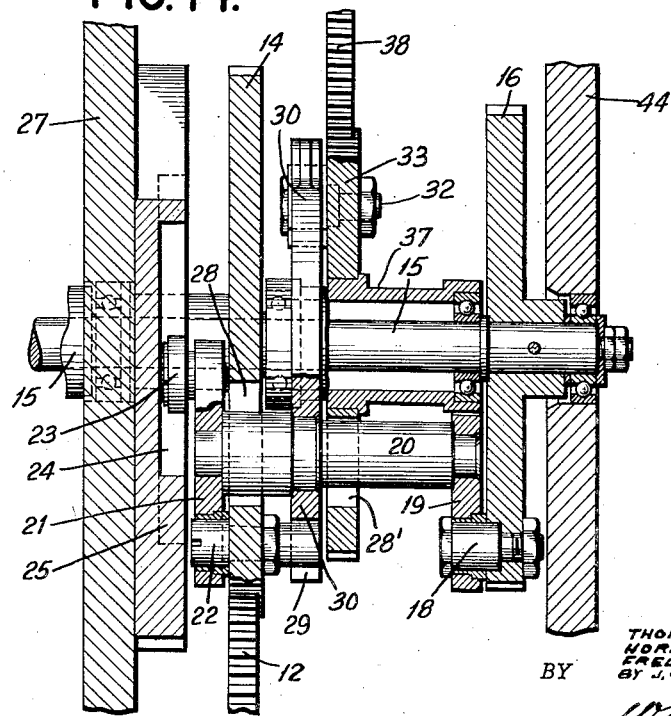

Fig. 14 is a longitudinal sectional view of the variable gear transmission mechanism.

Figure 15:
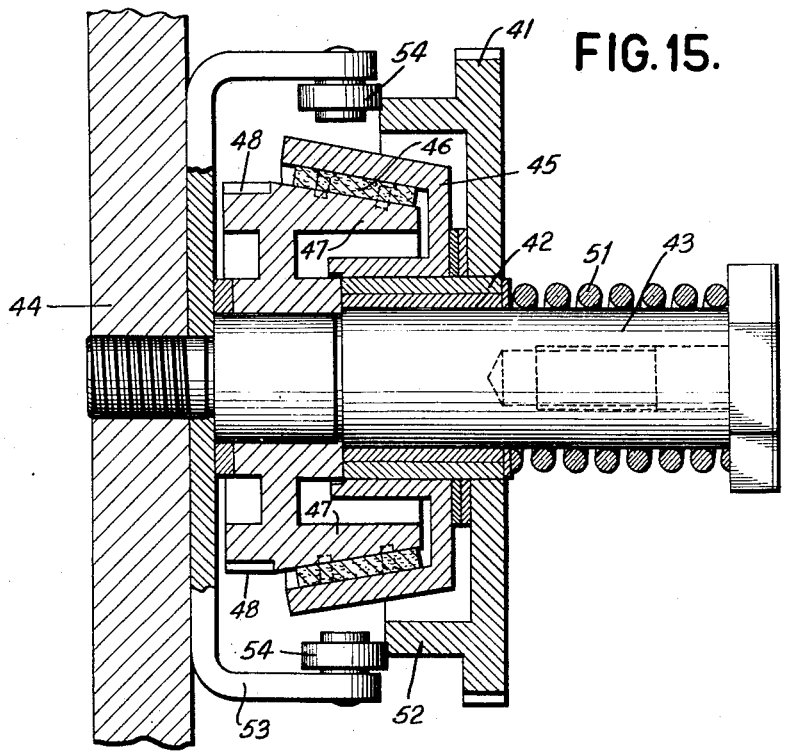

Fig. 15 is a transverse sectional view, showing a preferred form of restraining mechanism of the frictional type utilized to improve the operation of the variable gear transmission mechanism.

Figure 16:
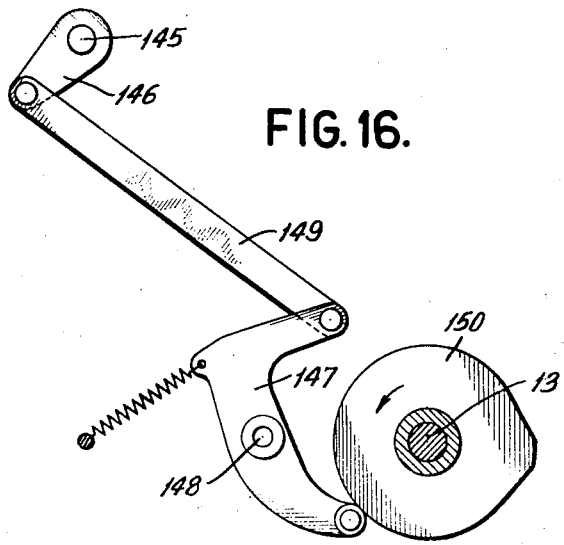

Fig. 16 is a detail view, showing one of the operating cams of the machine and associated follower arm.

Figure 17:
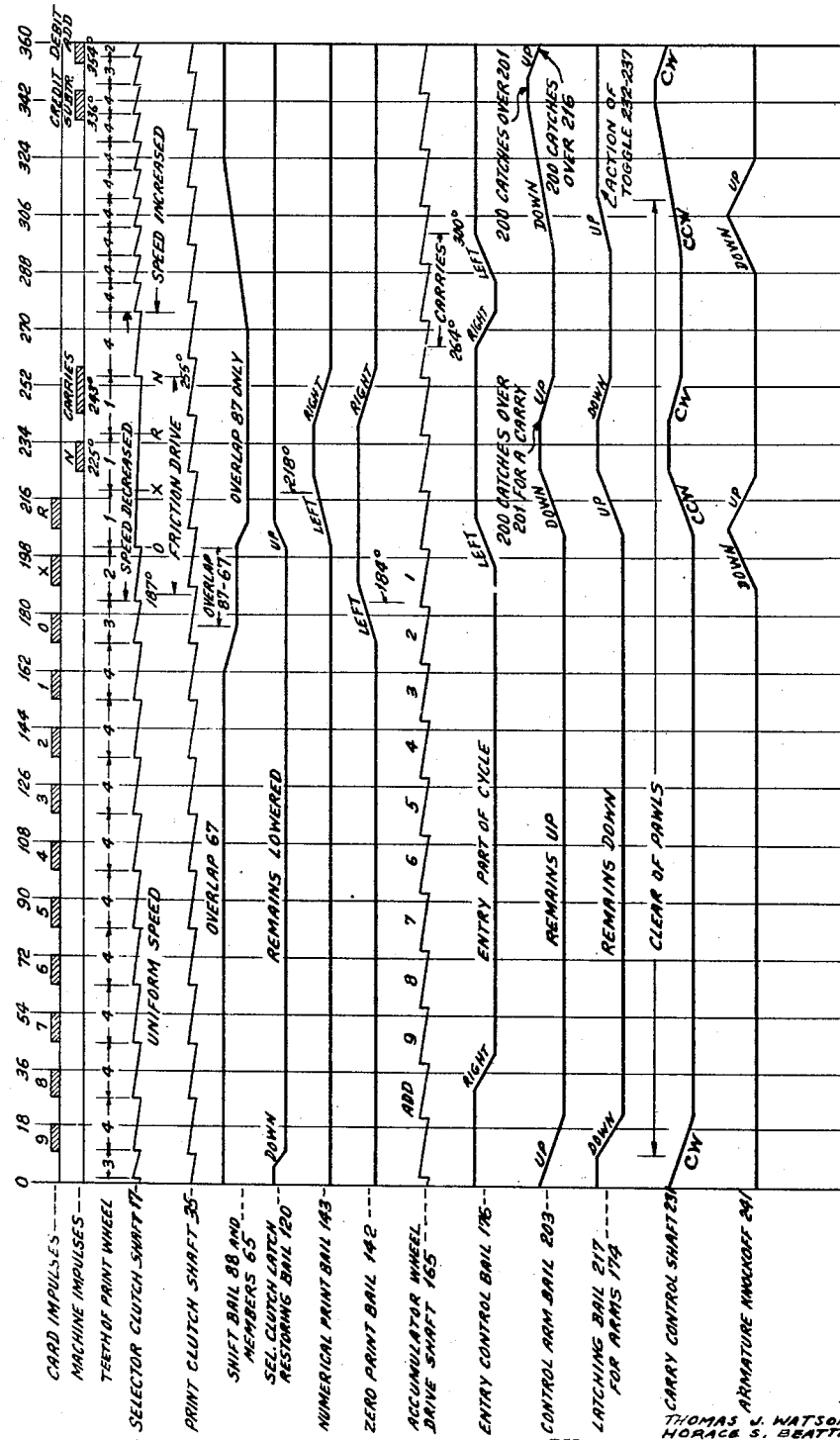

Fig. 17 is a timing diagram particularly for the mechanically operated parts of the machine.

Figure 18:
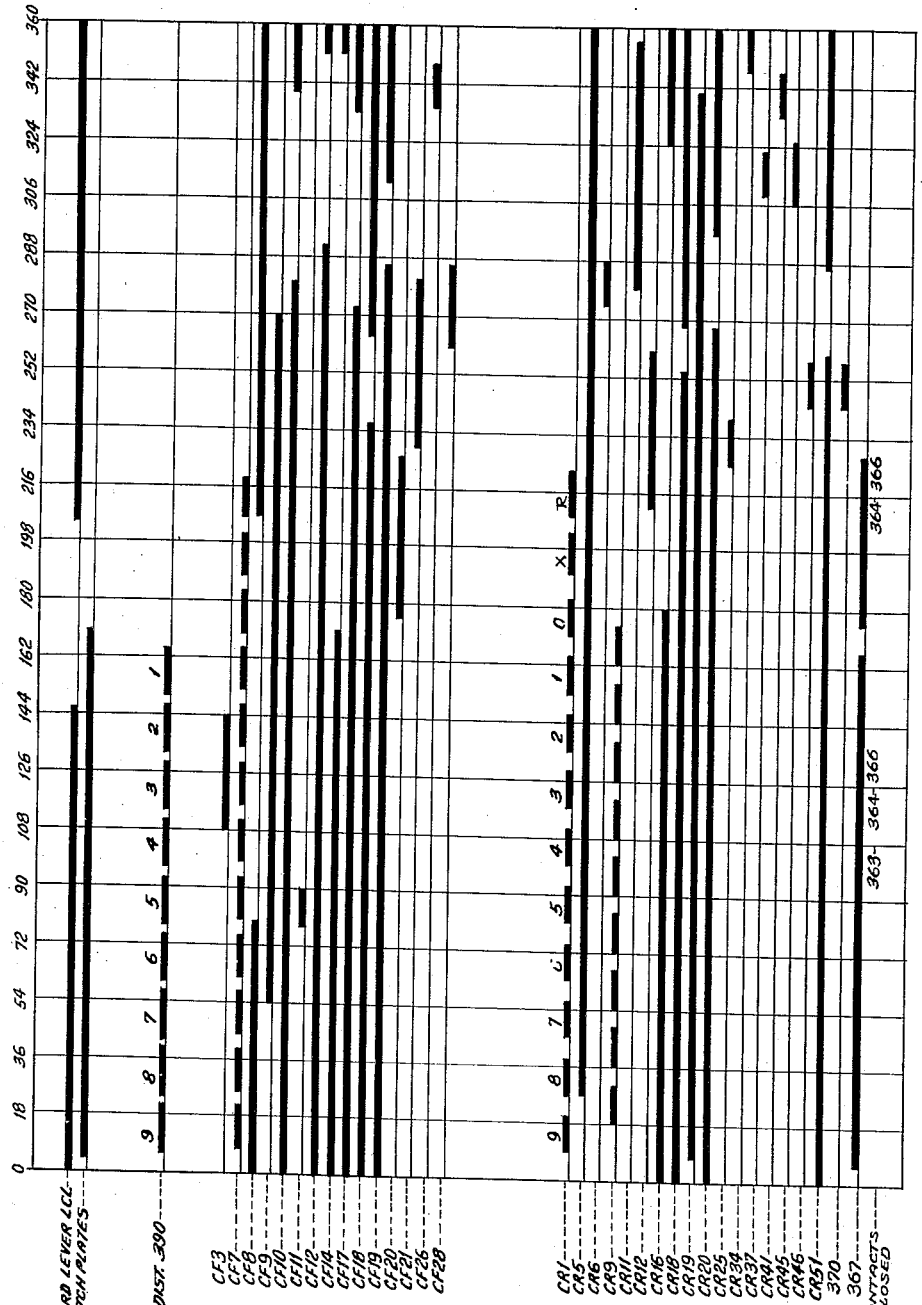

Fig. 18 is a timing diagram of the cam operated contacts and other impulse emitters.

Figure 19A:
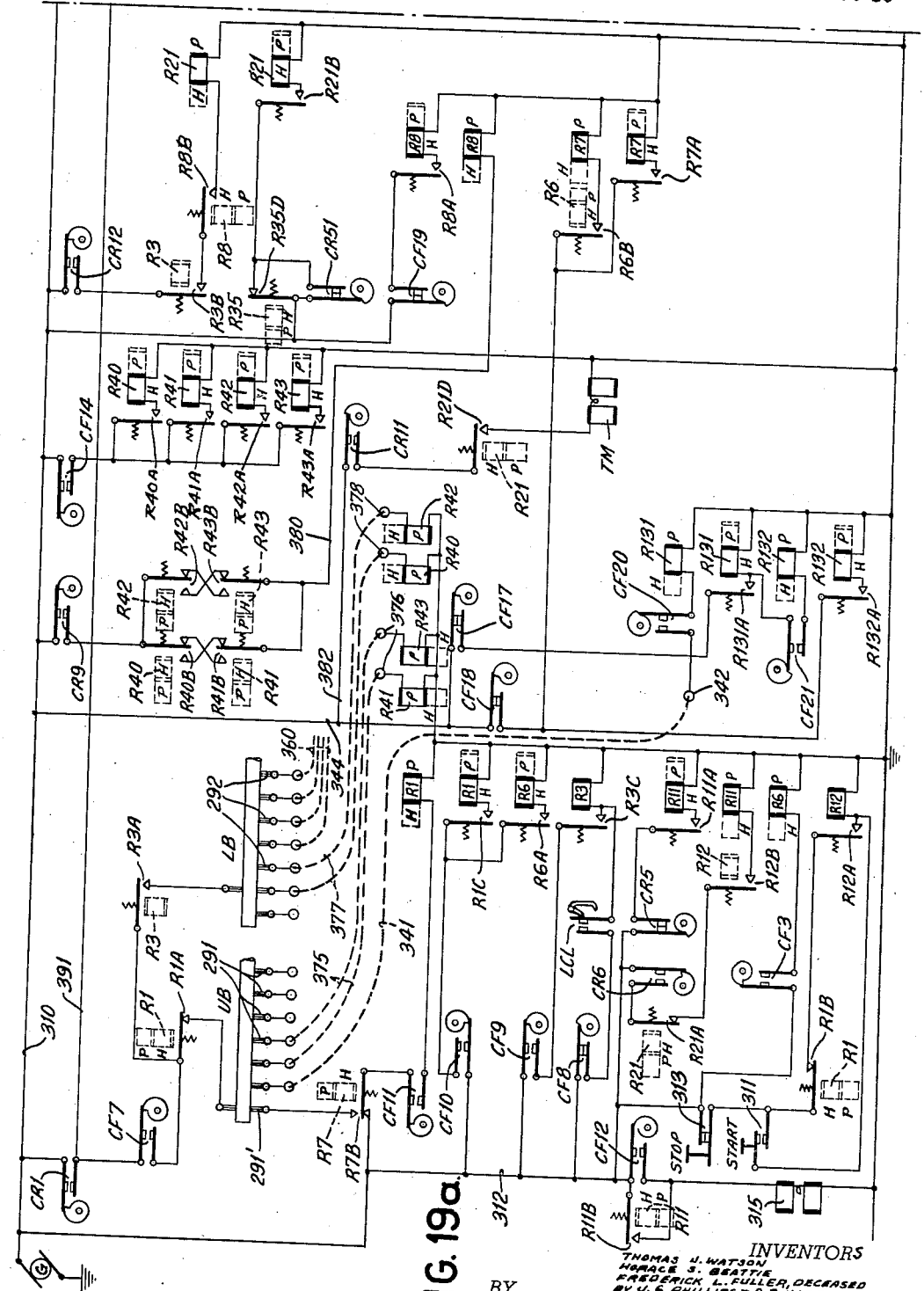
Figure 19B:
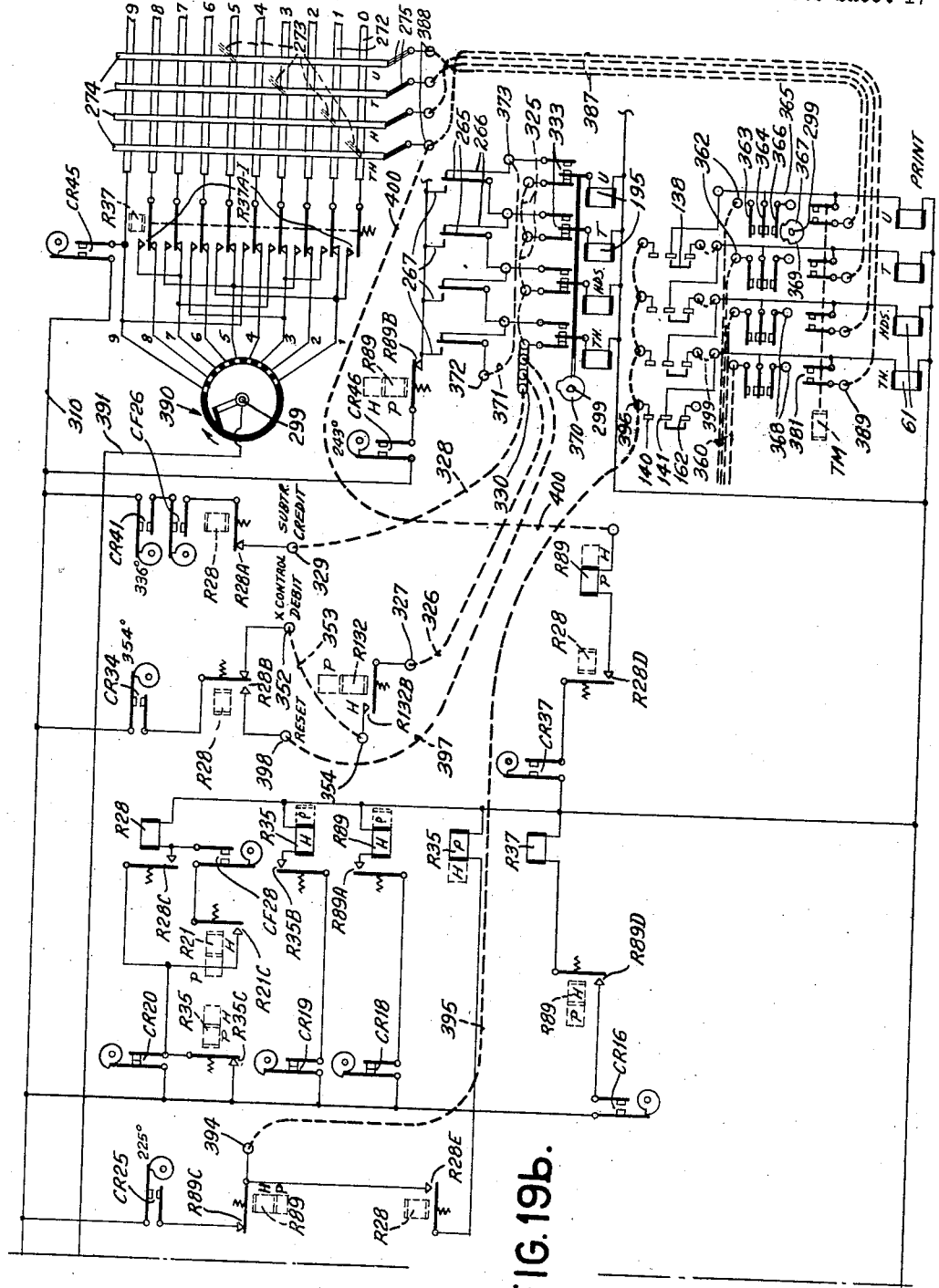

Fig. 19a and Fig. 19b when arranged together in such order comprise the wiring diagram of the machine.

Driving mechanism

The driving mechanism for the tabulating machine is best shown in Figs. 9 and 12 wherein it will be seen that 10 represents a constantly rotating shaft of the machine which is driven by an electric motor, the latter constantly running for successive operations of the tabulating machine. To the shaft 10 there is secured a gear 11 meshing with a gear 12 secured to a shaft 13. The gear 12 meshes with a gear 14 which is pinned to a shaft 15 and also secured to the shaft 15 is a gear 16 which is also shown in Fig. 14. Gears 14 and 16 rotate simultaneously with the shaft 15 to which they are pinned. The gear 16 through a pinion 34 (Figs. 9, 12) drives a shaft 35 and shaft 35 is the printer drive shaft which rotates with a uniform speed of rotation. Reference numeral 17 designates the other printer drive shaft which rotates with a uniform speed of rotation substantially synchronously with the drive shaft 35 but at times the speed of rotation given to shaft 17 is decreased with respect to the drive shaft 35 for a purpose to be more clearly understood later on. The variable drive for driving shaft 17 at the desired speed will now be described in detail: This mechanism is best shown in Figs. 12, 13 and 14. Pivoted by a stud 18 on the outer periphery of the gear 16 is an arm 19 and said arm carries a cross member in the form of a stud 20 which extends to the left as shown in Fig. 14 and is also carried by an arm 21 (Fig. 14) which is pivoted by a screw stud 22 on the gear 14. The screw studs 18 and 22 are always co-axial because they are pivoted on gears 14 and 16 which rotate simultaneously. The arm 21 carries a roller 23 which engages the cam race 24 of a plate 25 which is attached by screws 26 (Fig. 13) to a side frame member 27. The cam race 24 is so designed that the yoke comprising the two side arms 19 and 21 and the cross stud 20 may be rocked about the studs 18 and 22 and since the stud 20 passes through the gear 14, as shown in Fig. 14, the latter is cut out as shown by reference numeral 28 in Fig. 13 to permit this independent rocking movement of the yoke. The stud 22 also extends to the right through the gear 14 as shown in Fig. 14 to receive a fork 29 of an arm 30 through which also passes the cross rod 20. The arm 30 is also forked at 31 (see Fig. 13) to receive a stud 32 carried by a gear 33. The gear 33 is carried by a sleeve 37, the latter being mounted on the shaft 15 by ball bearing assemblies. The gear 33 through a pinion 38 drives the printer drive shaft 17 which is to be known as the variably driven printer drive shaft of the machine. With the parts at normal as shown in Fig. 13, gears 14 and 16 rotate in a clockwise direction, and the roller 23 will cooperate with a substantially concentric portion of the cam race 24 and since there will be no rocking of the arm 30 at this time, its connection to the gear 33 by engagement with the stud 32 carried thereby will cause the gear 33 to be given a rotation in a clockwise direction at substantially the same speed as the gears 14 and 16. This occurs from 0° to 171° during which time the 9–1 index point positions are successively analyzed by the analyzing brushes. When the roller 23 strikes a cam portion designated 24a (Fig. 13), which occurs at the time that the 0, X, and R index point positions are analyzed, the yoke is rocked by rod 20 counterclockwise about the pivot stud 22, rocking the arm 30 in the same direction, thus rotating the gear 33 counterclockwise or backwardly with respect to the rotation of gears 14 and 16. Gear 33 is cut out at 28' (Fig. 13) to enable this backward rotation without being interfered by stud 20 which passes through the slot 28' of gear 33. This will result in diminishing the speed of rotation of the gear 33 and shaft 17 during the analysis of the 0, X and R index point positions. After the reduction in speed of the gear 33 the roller 23 then enters the cam portion 24b (Fig. 13) and the latter is so designed as to rock the arm 30 clockwise and so fast that it will cause the gear 33 to rotate at a speed increased with respect to the gears 14 and 16. This increase in speed ensues during the latter portion of the machine cycle to make up for the previous relative displacement of gear 33 so that at the beginning of the next cycle the gears 14—16 and 33 are at their relative normal position.

It has been found in practice that the abrupt change in speed from the uniform speed of rotation of the shaft 17 to a lower speed of rotation has caused a "whipping" of the variably driven shaft 17, causing a strain upon this shaft as well as the parts operated thereby. To this end it is desirable to frictionally drive the shaft 17 by the following preferred means. The shaft 35 which is driven at the uniform speed of rotation has secured thereto at its right end a pinion 40 (Figs. 9 and 12) which meshes with a gear 41. The gear 41, it will be observed from Fig. 15, is secured in any suitable manner to a sleeve 42 loosely mounted upon a stud 43 which is screwed in the side frame member 44. The sleeve 42 also has secured thereto in any suitable manner a conically shaped clutch member 45. This constitutes the driving clutch member driven by the gear 41 and the other or driven clutch member consists of an annular shaped member 47 loosely mounted on the stud 43 and which carries a clutch facing 46 shaped at its periphery to provide a contour complementary to that of the driving clutch member 45. The driven clutch member 47 is provided with gear teeth 48 around its periphery and said gear teeth mesh as shown in Fig. 9 with a gear 59 (see Fig. 12) pinned to the shaft 17. A spring 51 (see Fig. 15) encircling the stud 43 urges the driving clutch member 45 against the driven clutch member 47, such action being controlled by the cam face formed on an annular cam ring 52 integral with the gear 41. A U-shaped plate 53 which is attached to the side frame member 44 so as to be stationary carries rollers 54 cooperating with the cam 52. The cam 52 is so designed that a separation is effected between the clutch elements 45 and 47 until at about 187° of the machine cycle at which time the rollers 54 will cooperate with a lower portion of the cam 52, enabling the spring 51 to force the clutch member 45 against the driven clutch member 47, thereby effecting a frictional drive from the shaft 35 to the shaft 17, this being maintained by the cam 52 from 187° to 255° of the machine cycle (see Fig. 17) during which time the 0, X and R index point positions are being analyzed on the card.

Referring to Fig. 9 the shaft 35 is driven in a counterclockwise direction at a uniform speed of rotation and by means of the variable speed drive, shaft 17 is being rotated in the same direction but at a reduced speed between 187° and 255° of the machine cycle. During this time the friction drive operates to drive the shaft 17 from the shaft 35 in the same direction and this friction drive in cooperation with the variable speed drive enables the latter to reduce the speed of the shaft 17 gradually and without any abruptness in change in speed. Of course, while the shaft 35 drives the shaft 17 through the friction drive its speed is determined by the variable speed drive, a certain amount of slipping being effected between the clutch elements 45 and 47 so that shaft 17 is driven only at the speed determined by the variable speed drive.

*Alphabet printing mechanism*

The machine is preferably provided with alphabet character printing type and means for selecting such type so as to print, aside from numerals, letters making up words or abbreviations.

The printing mechanism shown herein is generally similar to that fully shown and described in the patent to F. L. Fuller and H. S. Beattie, No. 2,199,561, dated May 7, 1940.

The alphabet type are selected by perforations arranged according to the code shown in Fig. 4b. The particular 0, X and R perforation appearing in a column determines which of the several type of a group related to an index point will be printed. For example, if the perforation should be at the "2" hole and no pilot hole is utilized in either the 0, X or R positions, the digit 2 will be printed. If a hole is also at 0 the 0 hole will select the type S; if at the X index point position, type K will be selected and if at the R position, type B will be selected.

Each index point position selects a group of three alphabet type (except the 1 hole) and also a numeral type. As will be later described, if a numeral type is to be selected for printing, the printing impressions will be taken at the "N" point in the machine cycle, which point is after the R index point position is analyzed. (See Fig. 17, timing for "Machine impulses.") The alphabet type selection is provided for by taking printing impressions before the time a numeral type would have been printed and this is effected under control of the 0, X and R index point positions.

If the hole is at the 9 index point position alone, the printing wheel 60 (Fig. 4) will be rotated counterclockwise until the 9 type is at the printing line and then the printing wheel 60 will be rocked to effect the printing impression. It will be noted that if a perforation is also at the R position, then under control of this perforation the printing wheel will be rocked earlier than for printing the digit 9 to take an imprint from the I type. The perforation at the X position will rock the printing wheel 60 to take an imprint still earlier to print R and the perforation at the 0 position even still earlier to print Z.

The same principle of operation is provided for selecting the type of the other groups of alphabet type and the operation of the printing mechanism for effecting type selection and printing impressions will now be described in detail:

The card is perforated with holes to represent the digits 0–9 and is passed by analyzing brushes by a card feeding mechanism which will be subsequently described in detail to analyze the index points in the order 9, 8, 7 . . . 1, 0, X and R.

When the analyzing brush senses a hole at any of the index point positions 9–1, a circuit is closed to a printing control magnet 61 (Fig. 4) and for each card column analyzed there is a printing control magnet 61. When a printing control magnet 61 is energized its armature 62 is attracted so as to pull a call wire 63 which rocks a bell crank 64. Pivoted to the bell crank 64 is a T-shaped member 65 and its head portion is provided with projections 66R and 66L, the extension 66R normally engaging an extension of a clutch release arm 67. The engagement of extension 66R and the clutch release arm 67 is retained in the relationship shown in Fig. 4 during the time the holes 9, 8, 7, 6, 5, 4, 3, 2 and 1 are analyzed to thereby cause the clutch release arm 67 to be rocked at a differential time when magnet 61 is energized.

Shaft 17, which it will be recalled, is driven at a variable speed but driven at a uniform speed during the time the index point positions 9–1 are analyzed, has secured thereto a tube 68 which is fluted transversely along its periphery so as to provide clutch notches 69. Tube 68 constitutes the driving clutch member. Encircling the clutch tube 68 is a plurality of gears 70, there being one gear 70 for each order of the printing mechanism. To provide for the lateral spacing between the gears 70 the gears are guided by slots 71 and 72 formed in a casting 73 as well as by guide slots 74 in a casting 75. By such spacing members the gears 70 are separated to allow independent movement and also to cause a clutch pawl 76 which is pivoted on the related gear 70 to cooperate with the clutch release arm 67. The clutch release arm 67 normally holds the clutch pawl 76 in such position that its clutch tooth 77 is out of engagement with any of the clutch notches 69 of the clutch tube 68. When the clutch release arm 67 is rocked as a result of the energization of the magnet 61, the clutch is engaged because a spring 79 attached to the clutch pawl 76 will rock the latter in order that the clutch tooth 77 will engage the clutch notch 69 determined by the time the printing control magnet 61 is energized. The above described clutch is the printing type selecting clutch and causes the differential rotation of the printing wheel 60. To rotate the type wheel 60, the gear 70 meshes with an idler gear 78 loosely mounted on a shaft 80 and the gear 79 meshes with the type carrying gear wheel 60 carrying the digit and alphabet printing type.

Fig. 4 shows the arrangement of the printing devices for a single order and the machine is preferably provided with duplicate devices for printing a plurality of characters.

If the 9 hole was analyzed, the clutch tube 68 would rotate the extent of one notch before the clutch engagement is effected by the energization of the printing control magnet 61. With the clutch retained engaged the printing wheel 60 will thereafter continue to rotate so as to select a group of type and successively present the characters Z, R, 1 and 9 of the selected group to the printing line. The differential time at which the printing control magnet 61 is initially energized determines the extent of counterclockwise rotation of the printing wheel 60 necessary to select a group of type. After the variable rotation of the printing wheel 60 has been effected and the printing impression effected, with the clutch still engaged the printing wheel 60 will continue to rotate until the free end of clutch pawl 76 strikes the clutch release arm 67 which, in the meantime, has been brought to its normal position. When such disengagement is effected the printing wheel 60 is at the normal position shown in Fig. 4.

Each printing wheel 60 is carried by an arm 81 loosely pivoted on the shaft 80 and provided with a rearwardly extending follower arm 82 which is operated by a cam projection 83 of a cam disk 85 which constitutes a driven member of a printing clutch.

Shaft 35 rotates a clutch tube 84 fixed thereto and which is similar to the clutch tube 68 and likewise encircling the clutch tube 84 is the driven clutch disk 85 upon which is pivotally mounted a clutch pawl 86. Associated with the clutch pawl 86 is a clutch release arm 87. When the clutch engagement is effected between the clutch pawl 86 and one of the clutch notches of the clutch tube 84, the disk 85 will be rotated in a counterclockwise direction whereby the cam projection 83 will cooperate with the follower arm 82 to rock arm 81 about the shaft 80 to effect the printing impression. The engagement of the clutch now being described is effected at differential times when the printing control magnet 61 for each order is again energized under control of the 0, X and R impulses, if one of the corresponding holes is present in the related card column.

The T-shaped members 65 are guided between guide plates 88 and said guide plates are carried by a pair of arms 89 loosely pivoted upon shaft 15 to form a bail to shift T-shaped members 65. After all of the index points 9—1 have been analyzed and by means to be subsequently described, the bail comprising the side arms 89 and transverse plates 88 is rocked counterclockwise about the shaft 15, first positioning the T-shaped member 65 so that extensions 66R, 66L overlap both the clutch release arm 67 and clutch release arm 87. Further movement to the left is subsequently effected so that the extension 66R will be disengaged from the related clutch release arm 67 but retain the engagement of extension 66L with the clutch release arm 87 for a purpose to be made clearer later on. At the present time it should be understood that while the 0, X and R index point positions are being analyzed, the projection 66L is over the extension of the related clutch release arm 87 but projection 66R is over the clutch release arm 67 only for the 0, X index point positions. The second impulse transmitted from one of the 0, X and R index point positions causes a second energization of the printing control magnet 61 which for 0, X also results in the rocking of the clutch release arm 67 but for 0, X this is ineffective. The reason for this is that if the zero hole is used as a pilot hole, other holes 1–9 are used in combination for alphabet printing (see code Fig. 4b) and the previous analysis of holes 1–9 caused the clutch release arm 67 to be operated. The second operation of arm 67 upon the analysis of the zero hole is, of course, ineffective. A similar reason applies in connection with the use of the X hole in alphabet printing. However, rocking of clutch release arm 87 causes the engagement of the printing clutch and the rotation of the cam disk 85 in a counterclockwise direction. During the time that the effective clutch notches 0, X and R successively pass by the clutch tooth of pawl 86 the shaft 17 is rotating at a diminished speed resulting in a movement of the printing wheel 60 of only one type for each notch of the clutch tube 84. Thus, the particular type which is to be selected from the selected group will depend upon the differential time that the printing control magnet 61 receives its second impulse and therefore the time at which the printing clutch is engaged. If the 0 perforation is analyzed, the printing clutch is engaged at the earliest time so as to select the first alphabet type of the selected group. If the perforation is at the X index point position the printing clutch is engaged at a later time when the next alphabet type of the selected group is at printing position and obviously when the perforation is at the R index point position, the printing clutch will be engaged at a still later time when the third successive alphabet type of the selected group is at the printing position. By the engagement of the printing clutch at a differential time the desired alphabet type of the selected group may be selected. When the printing clutch engagement has been effected each cam 83 will cooperate with the related follower arm 82 to rock the associated printing arm 80 to force the printing wheel 60 against the usual inking ribbon and platen 91 around which platen is positioned a paper strip to be imprinted. As each arm 80 is rocked, the printing wheel 60 is being rotated counterclockwise but since the printing wheel is now rolling over the gear 79 this rolling action will cause an equal and simultaneous rotation in a clockwise direction. Both of these opposite rotations will, in effect cause the printing wheel 60 to be immobile with respect to its rotation when it moves to the right to strike the platen 91, the type striking the platen squarely and firmly to cause a legible impression. After the printing operation the arms 81 are restored to normal by compression springs 82a, and each spring also functions to hold the follower arm 82 against the cam disk 83.

After the printing operation, since the type selecting clutch is still engaged, the printing wheel 60 continues to rotate as previously stated until the clutch pawl 76 strikes the clutch release arm 67 which, in the meantime, has been positioned to normal, thereby disengaging the type selecting clutch and which is effective when the printing wheels are at normal position.

The clutch which causes the rotation of the cam disk 85 to effect the imprint continues its engagement for a complete rotation of the cam 85 and the clutch disengagement is effected by the engagement of the clutch pawl 86 with the clutch release arm 87.

It has been found in practice that when the disengagement of the pawl 76 for the type selecting clutch is effected by striking the clutch release arm 67, there was a tendency of the clutch pawl 76 to rock clockwise about its pivotal point, unduly stretching the springs 78. To prevent this action, a cushioning arrangement is provided to hold the clutch pawl 76. In a preferred arrangement this constitutes for each type selecting clutch a double arm 92. One arm cooperates with a cam portion 93 of the clutch pawl 76 and the other arm bears against a spring pressed plunger 94 inserted in apertures 95 partially filled with oil. As the clutch pawl 76 comes around to its normal position, it will strike the clutch release arm 67, forcing its clutch tooth 77 out of the clutch tooth 69 it previously engaged and the cam portion 93 of the clutch pawl 76 will strike one arm of the double arm 92, forcing the opposite end downwardly to press the plunger 94. This will compress the oil at the bottom of the recess 95, thus providing a cushioning action on the arm 92 to restrain the clutch pawl 76 so that it cannot move too far outwardly.

In order to align the cam disks 85 at their normal position, associated with each cam disk 85 is a spring pressed detent 96.

Reference has been made to the bail which comprises the guide plates 88 and the side arms 89 and which bail is loosely pivoted on the shaft 15 and is rocked about such shaft to position the T-shaped interposers 65. Secured to a shaft 100 is a pair of arms 101 which carry a transverse bail bar 102 directly underlying the series of clutch release arms 87 to normally lock them against accidental movement. One arm 101 has a link connection 103 to an extension 104 of one of the arms 89. The means for reciprocating the rock shaft 100 is shown in Fig. 8 and it will be seen that secured to a rod 105 is a follower arm 106 carrying a roller 107 cooperating with a profile cam 108 secured to the drive shaft 15. A spring 109 attached to an extension of the follower arm 106 urges the roller 107 against the cooperating cam 108. Attached to the rod 105 is an arm 110 connected by a link 111 to an arm 112 secured to the rock shaft 100.

During the time that the 9-1 index points are being analyzed, the parts now being described and shown in Fig. 4 are retained in the position shown and bail rod 102 will underlie the clutch release arms 87. After the 1 index point position has been analyzed, roller 107 drops to a low part 108a of the cam 108, rocking the shaft 105 clockwise and the arm 110 connected thereto in the same direction, forcing the link 111 upwardly to rock the arm 112 and the shaft 100 in a clockwise direction. This will move bail 102 below the clutch release arms 87 to unlock them and by drawing the link 103 to the left it will be observed that the bail for shifting the T-shaped interposer 65 will be moved slightly to the left so that extension 66L now cooperates with the related clutch release arm 87, nevertheless retaining the positioning of the extension 66R over the extension of the related clutch release arm 87. Having moved the interposers 65 in such position the formation of the cam part 108a is such that the interposers will remain in this position during the analysis of the 0 and X index point positions. (See timing diagram, Fig. 17.)

After the 9-1 index point positions have been analyzed and the first impulses have been directed to the printing control magnets 61 it is desirable that their armatures 62 be positively retracted from the cores of the magnets in the event that residual magnetism retains the attraction. To this end, there is loosely pivoted upon the shaft 15 a bail 113 underlying the bell cranks 64. One of the side arms 101 and one of the side arms of the bail 113 are interconnected by a toggle connection which consists of an extension 114 of a related arm 101 and a link 115 pivoted to an arm of the bail 113, said members 114 and 115 being interconnected by a pivot rod 116. Members 114 and 115 at their juncture 116 provide a toggle system. When the clockwise movement is given to the bail 102 to shift the T-shaped interposers 65 after the analysis of the 9-1 index points it will be observed that during this clockwise movement the toggle system passes through and beyond its midcenter position. In passing from the normal off-center position to the other off-center position of the toggle system, the bail 113 will be reciprocated, thereby rocking the bell cranks 64 and through the call wires 63 positively retracting the armatures 62 if they should remain attracted to the cores of the related magnets. Hence, means is provided to positively retract the armatures, insuring that the next impulse directed to the printing control magnet 61 will have the proper effect. When the toggle system is in the other off-center position, the bail 113 will be in a position shown in Fig. 4, permitting the rocking of the bell cranks 64 by the second impulse directed to the related printing control magnet 61.

After the analysis of the X index point position, cam 108 is effective by a still lower cam part 108b to cause a still further clockwise rotation of the shaft 100 and by pulling link 103 to the left still further it will be seen that the bail plates 88 shift the interposers 65 so that the extensions 66R are now completely disengaged from the clutch release arms 67, nevertheless retaining the extensions 66L over the clutch release arms 87. This position is maintained during the analysis of the R index point position and also at the time that an electrical impulse is sent by a cam controlled contact at the "N" impulse time and which, from the timing diagram (Fig. 17), is initiated at about 225° of the machine cycle. Hence, only the clutch release arms 87 will be operative when the printing control magnets 61 are energized at the 0, X, R and N index points in the machine cycle.

It is desirable, of course, that the clutch release arms 87 be positively retracted to their normal positions to be in a position to disengage the printing clutches. This is effected after the N impulse transmission time by means of the bail 102 when it is returned to normal. By means of the operation of the cam part 108c (Fig. 8) on the follower arm 106 shaft 100 is rocked counterclockwise and bail 102 will rock the clutch release arms 87 to normal position if they have not been moved to such position by their associated springs. When bail 102 is restored to normal the toggle system 114-115 again passes through mid-center to reciprocate bail 113 to positively retract armatures 62.

It is, of course, desirable that likewise the clutch release arms 67 be urged to normal positions if they have not been moved to such positions by their associated springs. This is effected by means of a bail 120 (Fig. 4) which is carried by a pair of arms 121 secured to a rock shaft 122. The means for rocking the shaft 122 is shown in Fig. 8 wherein it will be seen that a cam 123 driven by shaft 15 cooperates with a follower arm 124 and said follower arm has a link connection 125 to an arm 126 secured to the rock shaft 122.

From the timing diagram (Fig. 17) it will be seen that for the timing of bail 120 at the initial part of the cycle the cam 123 enables, through the operating connections to the shaft 122, the rocking of the shaft 122 counterclockwise to draw bail 120 downwardly, releasing the clutch release arm 67 for operation during the analysis of the index point positions, 9–1, 0 and X. After the analysis of the X index point position and when the interposers 65 have been moved fully to the left so that their extensions 66R are disengaged from the clutch release arms 67 the cam 123 is effective through the operating connections shown in Fig. 8 to rock the shaft 122 clockwise, moving the bail 120 upwardly and by coaction with the clutch release arms 67 moving the latter to their normal positions.

Numeric printing mechanism

The type carrying wheel 60 is also provided with a series of numeral type 1–9 which are selected under control of the corresponding holes in the controlling card column. The type wheel 60 is also provided with a 0 type normally at the printing line to print intermediate zeros. Such zero printing as will be subsequently described in detail is provided for by an auxiliary control rather than be selected by the zero hole in the controlling card column.

With the previous description given for the operation of the alphabetic printing mechanism, it is understood that upon the analysis of one of the numeral holes 9–1, the printing control magnet 61 is energized, thereby effecting a variable rotation of the printing wheel 60 to select the corresponding numeral type. With initiation of the rotation of a series of printing wheels 60 at differential times, depending upon the holes analyzed in the controlling card columns, the printing wheels are variably rotated so that at a predetermined point at the machine cycle the numeral type selected are at the printing line at the same point in the machine cycle. When all of the selected numeral type are at the printing line a control is operative to cause the engagement of the printing clutch to print from the selected numeral type.

Referring to Fig. 4, each gear 79 is provided with a flange portion 130 formed to provide a cam portion 131 cooperating with one arm of a double arm 132 pivoted at 133. Whenever a printing wheel is rotated to select any numeral 1–9 or alphabet type for printing the rotation of the associated gear 79 clockwise will rock the arm 132 in a similar direction. A contact carrying member 134 is bifurcated at its upper end to receive a headed stud 135 carried at one end of the double arm 132. A spring 136 is interposed between said arm and an extension of the contact carrying member 134. The contact carrying member carries plates 137 of insulating material and since these are attached to each side of the member 134 they are spaced so as to receive a metallic contact member 138 which is pivoted at 139 between the insulating plates 137. Whenever a printing wheel 60 is variably rotated to select one of the digits 1–9 or alphabet type, the rocking of the double arm 132 clockwise will, through the spring 136, elevate the related contact carrying member 134 so that the contact member 138 is now coordinated with contact blocks 140 and 141 but spaced therefrom. During such movement, the lower portion of the contact carrying member 134 moves out of engagement with a zero printing bail 142 but retains an operative engagement with the numeric printing bail 143.

By circuit connections to be subsequently described at 225° of the machine cycle or at the "N" time, an electrical impulse is directed by cam controlled contacts and at this time bail 143 has moved to the left to cause the contact member 138 to shunt the contact plates 140, 141. Hence, through contact plates 140, 141 and contact member 138, the "N" impulse is directed to the printing control magnet 61 and at this time in the machine cycle each interposer 65 has been shifted so that only extension 66L is in cooperation with the clutch release arm 87. This will effect the engagement between the clutch pawl 86 and the "N" notch of the clutch tube 84, causing the rocking of the printing arms 81 so that the selected numeral type 1–9 are thereafter impressed against the platen 91 in the manner previously described.

It is understood, therefore, that alphabet type printing impressions are made at three different points in the operation cycle or after the 0, X, and R perforations are analyzed, whereas for printing the numerals 1–9, printing operations are made after all the perforations are analyzed and at a single point in the operating cycle.

The means for rocking the bail 143 to cause the elevated contact carrying members 134 to be rocked so that their contact plates 138 make contact with the contact plates 140 and 141 to transmit the "N" impulse to the printing control magnets 61 will now be explained. The numerical printing bail 143, as shown in Fig. 10, is carried by a pair of arms 144 secured to a rock shaft 145. At one end of the rock shaft there is attached an arm 146 also shown in Fig. 16. A follower arm 147 which is pivoted on a rod 148 has a link connection 149 to the arm 146 and said follower arm 147 cooperates with a profile cam 150 driven by the shaft 13.

Understanding that the elevated contact carrying members 134 only cooperate with the bail 143 under the conditions now assumed, cam 150 will be effective through the operating train shown in Fig. 16 to rock the shaft 145 counterclockwise, thereby urging the bail 143 to the left as shown in Fig. 4. This will force the contact carrying members 134 to the left so that their contact members 138 make firm electrical contact with the contact plates 140 and 141. As contact member 138 strikes contact plates 140, 141 bail 143 will rock the contact carrying member 134 about the pivot 139 to stretch spring 136 permitted because stud 135 is smaller than the bifurcation in arm 132. Tensioned spring 136 will urge contact member 138 firmly against contact plates 140, 141.

From the timing diagram shown in Fig. 17, it will be seen that for the timing of bail 143 the cam 150 is effective to rock the bail 143 to make the desired electrical contact 218° of the machine cycle. Such electrical contact is retained during the time that the "N" electrical impulse is directed at 225° of the machine cycle. After the impulse has been directed, the bail 143 is restored to the right to its normal position and, of course, after the gears 79 come to their normal position, shown in Fig. 4, the contact carrying members 134 are restored to normal, as shown in this figure.

Zero printing

In printing multidenominational numbers such as "309" or "300," it is necessary to insert the intermediate zero or any zeros to the right of the highest significant figure. In designation of numbers in a field comprising a plurality of card columns, if the number of digits is less than the number of card columns, zeros are provided at the left of the highest significant digit. It is undesirable that such zeros be printed and by the zero printing mechanism, the printing of such zeros from the controlling card columns is suppressed and only the intermediate zeros, or zeros to the right of the first significant digit, are printed. This controlling mechanism is different from that shown in the aforementioned patent to F. L. Fuller et al., No. 2,199,561 but corresponds to the arrangement shown and claimed in the patent to H. S. Beattie, No. 2,381,862, issued August 14, 1945, and will now be described in detail.

In selecting the zero type on the printing wheel 60 for printing intermediate zeros or zeros at the right, the type selecting clutch is not engaged and only the printing clutch is engaged to rock the printing wheel carrying arms 89 so that rolling of the type wheel 60 over the now stationary gear 79 will bring the zero type to the printing line and impressed against the platen 91. As will be more clearly described later on when the operation of the machine is described in connection with the wiring diagram, the cam operated contact which controls the impulses directed to the printing control magnets under control of the analyzing devices does not close at the zero index point position when the machine is plugged up for numeric printing. Hence, since such impulses are not directed to the printing control magnets 61 and 0 holes in any of the controlling columns are ineffective and obviously for card columns above the highest significant digit such 0 holes are ineffective and zero printing will be suppressed for corresponding orders.

For zero printing of intermediate zeros and zeros to the right of the first significant digit, bail 142 is effective to prepare an electrical circuit for effecting the energization of the printing control magnet 61 and the engagement of the printing clutch. The bail 142, as shown in Figs. 4 and 10, is carried by a sleeve 155 loosely mounted on shaft 145 and integral with the bail 142 is a yoke or cross-over bail 156 to which is secured an arm 157, loosely mounted on the shaft 145. Referring to Fig. 9 it will be seen that a follower arm 158 pivoted on a stud 148 has a link connection 161 to the arm 157. The follower arm 158 cooperates with a profile cam 160 driven by the shaft 13.

It will be observed that in the counterclockwise rotation of cam 160 the follower arm 158 will be rocked to rock the shaft 145 counterclockwise through the operating train. This will result in the counterclockwise rotation of the bail 142 and since, at this time, the contact carrying members 134 for those orders in which zero printing is to be effected are at the normal position in Fig. 4, movement of the bail 142 to the left will cause at about 184° (see timing diagram, Fig. 17) contact between the contact members 138 and the contact plates 141 and 162. The cam 160 maintains such contact as shown in the timing diagram (Fig. 17) at the time that the "N" electrical impulse is transmitted. This impulse is transmitted by the contact plates 141 and 162 now electrically shunted by the associated contact member 138 and is transmitted to the printing control magnets 61 associated with the card columns in which zero printing is to be effected. At this time the extensions 86L of the T-shaped interposers 86 are in operative engagement with only the clutch release arms 87 and the rocking of such clutch release arms 87 will engage the printing clutch, causing the cam disks 85 to rock the type wheel carrying arms 89, thus causing the printing wheel 60 to roll over the printing gears and strike the platen 91, the zero type on such wheels being selected thereby for zero digit printing.

Accumulator mechanism

The machine is provided with an accumulator in which positive and negative entries are made for the purpose of securing a balance of debit and credit entries. Associated with the accumulator is a total taking mechanism which controls the printing mechanism to print the balance whether such balance is positive or negative in character. Although the full capacity is not shown in the drawings the present machine provides for an accumulator capacity of one hundred orders and by selective plugging arrangements to be later described the accumulator may be sub-divided into independent units, each of a predetermined computing capacity. To insure the entry in the accumulator of the amount corresponding to the printed amount the operation of the accumulator element is initiated or terminated by the type selecting clutch of the related printing order. That is to say, the initiation of the rotation of the printing wheel to a differential position will initiate or terminate the operation of the related accumulator element, depending upon the character of the entry.

The accumulator elements are rotated by a fluted rod or drive shaft 165 secured to a drive shaft 166 (Fig. 4a). Referring to Fig. 5 to the shaft 166 there is secured a gear 167 which meshes with a gear 168 attached to a shaft 169. To the shaft 169 there is attached a gear 170 meshing with the gear 171 secured to the drive shaft 13. The gear ratio of the gears 171, 170, 168, 167 is such so as to cause the rotation of the fluted rod 165 twice for each revolution of the drive shaft 13 and with a uniform speed of rotation throughout the machine cycle. Each accumulator element 172, as shown in Fig. 4a, is rotatable on a fixed rod 173 and each accumulator order is provided with an accumulator entry control arm 174 pivoted on rod 173 which has rotatably mounted thereon an idler pinion 175. To enable the counterclockwise rocking and restoration in a clockwise direction of the arms 174 there is provided a bail 176 carried by arms 177 secured to a rock shaft 178. By positioning the bail 176 to the right the accumulator arms 174 may be rocked about the rod 173 so as to mesh the idler pinion 175 with the teeth of the fluted drive shaft 165. In the counterclockwise rotation of the fluted drive shaft 165 the teeth of the latter will drive the related pinion 175 clockwise, thus rotating the accumulator element 172 counterclockwise to a differential extent which is predetermined in the manner now to be explained:

Entry of credit amounts negatively

In order to secure advantages which will be very apparent later on, credit amounts are entered into the accumulator negatively and preferably by the entry of the tens complement of such amounts. At this time there will be explained the manner in which each order of the accumulator is operated so that it will be actuated differentially to an extent which is the nines complement of the digit printed by the related order of the printing mechanism. From the timing diagram (Fig. 17) it will be observed that the bail 176 is always rocked to the right during the initial part of the entry part of the machine cycle in which the amount is to be entered either additively or negatively. To effect the rocking of the bail 176 at the desired times the rod 178 has connected thereto a follower arm 179 (Fig. 5) co-operating with a cam 180 secured to drive shaft 169. At the other end of the rod 178 it will be seen that attached thereto is a follower arm 181 (Fig. 6) cooperating with a cam 182 secured to drive shaft 169 which cam is precisely the same in cam contour as the cam 180. The follower arm 181 has an integral follower arm 183 (Fig. 6) cooperating with a complementary formed cam 184 which is secured to the shaft 169. By such operating train the entry control bail 176 is positively reciprocated with the timing shown in Fig. 17.

The bail 176 normally abuts extensions 185 of the accumulator control arms 174 (Fig. 4a). To guide the control arms 174 it will be observed that the lower ends thereof operate in slots 186 of a crossbar 187 and that the upper ends operate in slots 188 of a crossbar 189. Pivoted on a stud 190 carried by the control arm 174 is a lock pawl 191, the upper end of which engages the interdental spaces of the pinion 175 and the lower end of which is urged by a spring 192 to fit in a notch 193 of a stationary bar 194. It is obvious that as the bail 176 rocks to the right at the initial part of the cycle the springs 192 will be effective to hold lower ends of pawls 191 in the notch 193 to thus cause the lock pawls 191 to rock clockwise about the pivot studs 190, causing each lock pawl 191 to be moved out of cooperation with an interdental space of the pinion 175, unlocking it before it is engaged by the teeth of the fluted drive shaft 165. The rocking of the pawl 191 in this direction will urge the pivot stud 190 to the right and the tension in spring 192 is effective to cause the extension 185 of the control arm 174 to continuously abut the bail 176 as the bail 176 is moved to the right. In this manner, arms 174 follow the movement of bail 176 and the idler pinions 175 are unlocked prior to their engagement with the drive shaft 165 and when such engagement has been effected the fluted drive shaft 165 will drive the pinions 175 in a clockwise direction and the accumulator elements 172 in a counterclockwise direction.

In effecting the entry of credit amounts negatively there is no restraint in the movement of the accumulator control arms 174 at the initial part of the cycle so that at the beginning of the cycle all of the accumulator elements of an accumulator unit begin to rotate simultaneously and are individually rotated until the type selecting clutch of the related printing order is engaged. Assuming that the digit to be printed comprises the digit "6" it will be understood that at the beginning of the cycle the accumulator element begins to turn and will be turned for three steps so as to enter "3," which is the nines complement of the digit 6. The means for terminating the rotation of the accumulator element when the nines complement of a digit has been entered will now be described in detail:

Whether an amount is to be entered additively or negatively is predetermined in the final part of the preceding machine cycle and for entering credit items negatively it will be seen from the timing diagram of Fig. 17 that an impulse is directed at about 336° of the preceding cycle, and by circuits to be described to control magnets 195 (Fig. 4a), there being one control magnet 195 for each denominational order of the accumulator. When an impulse is directed to a control magnet 195 its armature will be rocked so as to pull a link 196 to the right to rock a latch pawl 197 which unlatches a triple armed member 198 which is then urged by its associated spring 199 so that a hook portion 200 will catch over a projection 201 of a control member 202. A bail 203 also retains at this time the control member 202 in such position that the hook 200 will catch over the projection 201 when magnet 195 is energized by the impulse at 336° of the preceding machine cycle. While bail 203 is subsequently moved upwardly the latching of the control member 202 in the manner just described will retain it in its latched position during the entry part of the next cycle. Pivoted to each control member 202 is a link 204 which at its left end is in form of a hook 205 normally catching over a stud 206 of a depending link 207. The link 207, it will be observed from Fig. 4, has a hook portion 208 catching over a stud 209 of one arm of the double arm 132 and said link is also guided by a guide stud 210 received by an elongated notch formed in the link 207. When the accumulator control arm 174 is rocked to initiate the rotation of the accumulator element in the initial part of the next entry cycle a stud 211 carried by the accumulator control arm 174 is positioned so that it directly overlies a projection 212 of the related control link 207 and understanding that each link 207 is retained in the position shown in Figs. 4 and 4a when credit entries are to be entered negatively, it will be observed that when the printing type selecting clutch shown in Fig. 4 is engaged and gear 79 begins to rotate at a differential time in the cycle the double arm 132 will be cammed or rocked clockwise in the manner previously described. This will elevate the control link 207 and since the projection 212 is now directly beneath the stud 211, it will be evident that the rocking of the arm 132 in a clockwise direction will elevate the link 207 and rock the accumulator control arm 174 clockwise so that the pinion 175 is disengaged from the fluted drive shaft 165 and such position will be maintained for the remainder of the entry portion of the cycle. Obviously as the accumulator control pinion 175 is moved to a disengaged position the lock pawl 191 will again engage an interdental space of the pinion 175 to lock the accumulator element in its differential rotated position.

For each accumulator order the same operation is effected, that is, the rotation of an accumulator pinion is initiated at the beginning of the cycle and its rotation is terminated at a differential time and under control of the type selecting clutch when the latter is engaged, to thereby enter the nines complement of each digit of the credit amount.

Entry of "9" is effected in "0" represented orders to the right of the highest significant digit and to orders at the left of this digit because the bail 176 is timed to move to the left to disengage accumulator pinion 175 from the fluted drive shaft 165 at about 198° after a "9" digit entry has been made in such orders. Although "0" may be represented in such orders at the right by a hole at the "0" index position, no impulse is received by the related magnet 61 when such hole is analyzed for reasons to be pointed out in detail hereinafter in the chapter "Circuit connections for alphabetic listing."

For each order of the accumulator the nines complement of the digit to be printed is entered in the accumulator order and as will be subsequently described in connection with a computing problem, unit carries are effected in a special manner, and the fugitive unit is entered in the lowest or units denominational order, both being effected to convert the nines entry to the tens complement entry.

*Entry of debit amounts additively*

A reverse mode of accumulator operation is performed to cause the entry of the debit amounts additively. In general, the rocking of the accumulator arms 174 under control of bail 176 at the beginning of the entry part of the cycle is frustrated by a control effective in the latter part of the preceding cycle and such arms are kept latched in their normal position until the engagement of the type selecting clutch is effected when unlatching takes place under control thereof to initiate the rotation of the accumulator element 172 at a differential time which continues until the termination of the entry part of the cycle to thereby additively enter the digit printed.

The entry of debit items additively is determined by the transmission of an adding control impulse which, from the timing diagram in Fig. 17, is transmitted to control magnets 195 about 354° of the machine cycle preceding the cycle in which the additive entry is to be effected. The energization of the control magnets 195 at this time causes the unlatching of the triple arm members 198 as before but at this time the bail 203 has permitted the control members 202 to be rocked by their springs 215 so that each hook portion 200 now catches over an extension 216 of the related member 202. (See Fig. 17, timing of bail 203.) This has permitted the members 202 to rock counterclockwise a slight amount so that links 204 are now pushed to the left from the position shown in Fig. 4a to shift the lower ends of links 207 to disengage the hook portions 212 of links 207 from the studs 211 of the accumulator control arms 174 but shift the upper ends of links 207 only a slight amount still retaining the hook portions 208 (Fig. 4) in engaging relationship with the studs 209. The above operation takes place in the last part of a machine cycle preceding the cycle in which the additive entry is made.

A bail 217 (Fig. 4a) carries individual spring pressed plungers 218 as well as a transverse rod 219 and each of the links 204 passes between the rod 219 and the related plunger 218. By an operating train to be subsequently described the bail 217 is rocked counterclockwise as viewed in Fig. 4a while the links 204 are being shifted to the left and the rocking of the bail 217 will rock the links 204 about their pivot connection to control members 202 so that a hook portion 220 of each link 204 will be urged by the related spring plunger 218 to contact with a lug 221 which is an integral part of the related accumulator arm. Further movement of link 204 to the left causes hook 220 to slide off lug 221 so that it is urged by the related plunger 218 to catch aside of the lug 221 of the related accumulator control arm 174. The result of this operation is to cause the mechanical latching of the accumulator control arms 174 before the entry part of the cycle and before the bail 176 begins its movement to the right at the initial portion of the entry part of the cycle. Hence, for additive entries the accumulator control arms 174 remain latched in the position shown in Fig. 4a so that the accumulator drive pinions 175 cannot be engaged with the fluted driving shaft 165 until the type selecting clutch is engaged.

When the hook portion 220 catches aside of the lug 221, the upper end of the link 207 is, nevertheless, in such a position that the upper hook portion 208 (Fig. 4b) is still over the stud 209 and hook 205 still engages stud 206 of link 207. When the type selecting clutch is engaged the double arm 132 is rocked as previously described which will elevate the link 207 against the action of the spring pressed plunger 218, rocking the link 204 about its pivotal connection to control member 202 so that the hook portion 220 is now disengaged from the lug 221 of the related accumulator control arm 174. This will unlatch the accumulator control arm 174 and the latter will be rocked by its spring 192 so as to engage the accumulator drive pinion 175 with the fluted driving shaft 165. The engagement of the pinion is, therefore, effected at a differential time when the printing wheel is initiated in its rotation. The rotation of the accumulator element 172 will continue until the termination of the entry part of the cycle at which time the digit corresponding to the digit printed by the related printing order has been additively entered in the related accumulator order. When the accumulator elements have been differentially rotated the bail 176 is restored to the left and thereafter the bail 203 is moved downwardly at the same time that the bail 217 is moved upwardly. (See Fig. 17.)

It is pointed out that in the entry of the credit items negatively as previously described the bail 217, nevertheless, moves downwardly before the entry part of the cycle but since the links 204 have not been moved from the position shown in Fig. 4a, it is evident that when the bail 217 is rocked downwardly the plungers 218 will take up some of the movement so that the hook portions 220 merely rest on the top of lugs 221 and remain there when arms 174 are rocked later. Thereafter, when the link 207 is elevated it will rock the link 204 about its pivotal connection to control members 202 and merely compressing springs of the spring pressed plungers 218. Hence, in the negative entry operations of the accumulator, control arms 174 are not latched by this latching mechanism.

The means for rocking the bails 203 and 217 is best shown in Figs. 5, 7 and 11. Pivoted on a stud 225 is a follower arm 226 of bell crank formation carrying rollers cooperating with complementary cams 227 secured to the drive shaft 169. The follower arm 226 pivotally carries a block 228 (Fig. 5) which is received by an open slot 229 of an arm 230 secured to a rock shaft 231. Attached to the rock shaft 231 are arms 232 which have link connections 233 to lower extensions 234 of the side arms 235 which are part of the bail 203. At the end of the preceding machine cycle and the initial part of the cycle the cams 227 are effective to rock the rod 231 clockwise and the arms 232 in the same direction, shifting the links 233 to the right as viewed in Fig. 5 and rocking the bail 203 counterclockwise about its pivot 236, or upwardly as viewed in Fig. 4a. This operation is effected before the entry part of the machine cycle and after the entry has been effected the reverse action ensues so as to restore the bail 203 to the position shown in Fig. 5 and Fig. 4a.

The same operating mechanism is also utilized to reciprocate the bail 217 to effect the functions previously described. To this end each arm 232 has a toggle link connection 237 to one of the side arms 238 of the bail 217, said side arms being pivoted on a rod 240. Obviously, when the arm 232 is rocked clockwise the link 237 is pulled downwardly to depress bail 217, and vice versa.

In Fig. 4a reference numeral 241 represents a bail cooperating with tails 242 of the latch arms 198 and the purpose of the bail is to rock the latch arms 198 clockwise to disengage them from either the projections 201 or 216 and at the same time maintain the latch arms 198 in such positions that springs 199 will be effective to rock the latch arms 197 so that they will latch under the latch arms 198, as shown in Fig. 4a. The bail 241 is carried by a pair of arms 243 which are secured to a rod 244. By rocking the rod 244 the desired operation of the bail 241 is effected and the operating mechanism for effecting this is shown in Fig. 3a.

Attached to the shaft 169 is a profile cam 245 and cooperating with said cam is a follower arm 246 pivoted on a rod 247, the follower arm having an integral lug 248 cooperating with a downwardly extending arm of a bell crank 249 which is secured to the rod 244. From the timing diagram of Fig. 17 it will be seen that just prior to the completion of the entry part of the cycle the cam 245 will rock the follower arm 246 clockwise and the bell crank 249 and rock shaft 244 counterclockwise. This, as viewed in Fig. 4a, will depress the bail 241, rocking the arms 198 so that they may be relatched by the latch pawls 197.

In the event that due to residual magnetism of the cores of the control magnets 195 the related armatures stick thereto then it is desirable to positively retract the armatures. To this end there is pivoted on a rod 250 (Fig. 4a) a bail 251 which overlies the tails 252 of the pawls 197. One of the side arms of the bail 251 has a depending projection 253 and likewise one of the side arms 243 of the bail 241 has a depending projection 254, said projections 253 and 254 being in alignment therewith. When the bail 241 is moved downwardly the projection 253 moves the bail 251 downwardly, thus forcing each of the latch pawls 197 clockwise, if it has not been moved in this direction, to relatch the associated latch arm 198. This insures the retraction of the armatures of the control magnets 195 and also insures that the arms 198 are properly latched in readiness for the next operation.

*Units carry mechanism*

The accumulator has associated therewith a units carry mechanism for augmenting an accumulator element of a higher order by a unit under control of the accumulator element of the lower order when the latter passes from 0 to 1, contrary to the usual custom of carrying a unit when an accumulator element passes from 9 to 0. In general, transfers are effected by again reciprocating bail 176 between 264° and 300° of the machine cycle after the entry part of the cycle has terminated. (See Fig. 17.) This reciprocation is sufficient to enable the fluted drive shaft to turn the idler pinion 175 of each control arm 174 which is not latched one tooth space to augment the related accumulator element by a unit. The accumulator control arms of those accumulator elements which are to receive a units carry are not latched and are free to follow the movement of the bail 176 whereas the accumulator control arms of those accumulator elements which are not to receive a units carry are latched in normal position.

Units carries are controlled by electrical contacts and electrical circuits to be subsequently described in connection with the wiring diagram and at this time the description of the units carry mechanism will be given, particularly in connection with Fig. 4a and the timing diagram of Fig. 17.

Each accumulator element 172 has secured thereto a carry control cam 260 having a high cam portion 261 which, when the related accumulator element passes from 0 to 1 in a counterclockwise direction, will rock a carry arm 262, enabling an associated latch pawl 263 to engage a shoulder 264 of the carry arm 262 and latch it in rocked position. The insulation at the rearward end of the carry arm 262 is beneath the intermediate contact blade 265 and at the "0" position of the accumulator element 172 the blade 265 of each order is in electrical contact with a contact blade 266. When a carry arm is rocked as a result of the passage of an accumulator element from 0–1 during the entry part of the cycle, there is a transfer of the associated carry control contacts indicating that the next higher order is to receive a units carry after the entries have been made in the accumulator.

Normally the latch pawls 263 are urged by their related springs so that they bear against a shoulder 268 which is the bottom of a longitudinal notch 269 formed in the rod 231. From the timing diagram of Fig. 17 it will be observed that in the initial part of the cycle and before entries are effected the rod 231 will be rocked clockwise so that the notch 269 thereof is so positioned with relation to the tails of latch pawls 263 to enable the pawls to be urged by their respective springs to latch the rocked carry arms 262. The rocking of rod 231 was previously referred to in a description made in connection with Fig. 5 and it will be recalled that a counterclockwise and clockwise rocking of the rod 231 is effected after the entry part of the cycle but the notch 269 is, nevertheless, in such rocked position of the rod 231 as to permit the free movement of the latch pawls 263 and to remain in latching position. The part of the machine cycle in which the latch pawls 263 are free of notch 269 is indicated in Fig. 17 by the legend "Clear of pawls." Summarizing, during the entry part of the cycle, one or more of the carry control contacts will, if carries are to be effected, be transferred and by circuit connections to be subsequently described an impulse is directed through such transferred contacts to the control magnet 195 of the next higher denominational order.

The units carry impulse is effected at 243° of the machine cycle by a cam operated contact and before this time the bail 203 has moved down to restore all of the members 202 to the position shown in Fig. 4a. After this the carry impulse is directed under control of the shifted carry contact blade 265, contact blade 267 now in electrical contact with contact blade 265 to a control magnet 195 of the next higher denominational order to thereby cause, in the manner previously described for subtractive entry operations the unlatching of the related latch arm 198 so that control member 202 associated with the accumulator element of higher denominational order will be latched by hook portion 220 catching over the projection 201. After this operation the bail 217 is depressed but for each order that the associated control member 202 has been latched by engaging projection 231 the related accumulator control arm 174 will not be latched and will be free to follow the movement of the bail 176 to the right and left during 264°–300° of the machine cycle to thereby cause the pinion 175 and the intermeshed accumulator element 172 to be turned the extent of one tooth space, to enter a unit in the higher order accumulator element.

Obviously, for each denominational order which is not to receive a units carry the related control magnet 195 will not be energized and since the associated latch arm 198 will not be unlatched the subsequent elevation of the bail 203 will permit member 202 to rock counterclockwise to its greatest extent and the related link 204 to be shifted to the left. At the same time the bail 217 is depressed, forcing the hook 220 to latch over the lug 221 to latch the accumulator control arms 174 in the manner previously described. Hence, for such orders which are not to receive a units carry, the accumulator controls arms 174 will be latched and held latched during the time that the bail 176 is reciprocated to enable a units carry in desired orders.

After the units carry, the bails 203 and 217 will be returned to normal by movements in opposite directions, restoring the parts to normal as shown in Fig. 4a. Of course, the bails 241 and 251 (Fig. 4a) are gain reciprocated to effect the restoring functions previously described in detail.

After the carry impulses have been directed to the control magnets 195 to control the units carry, the rod 231 is restored in a counterclockwise direction at the end of the cycle and after carries are effected, causing the shoulder 268 of the longitudinal notch 269 of rod 231 to now strike the tails of latch pawls 263, moving them to unlatching position and enabling the positioning of the contact blade 265 to the normal position shown in Fig. 4a.

*Accumulator readout*

The accumulator is provided with a readout structure by means of which the balance amount on the accumulator may be read out to control the recording of such balance. As shown in Fig. 4a geared with each accumulator element 172 is a pinion 270 and said pinion is insulatably mounted to rotate upon a rod 271 of insulating material. Extending longitudinally along the rod 271 and inserted about the periphery of the rod 271 are contact bars 272 which are metallic and are spaced around the periphery of the rod 271. An emitter is wired to such contact bars 272 and by reason of the emitter being capable of transmitting digit representing electrical impulses to such contact bars 272 at differential times the bars have digital values assigned to them and which are designated in Fig. 4a. Each pinion 270 rotates a brush 273 which makes electrical contact with the contact bars 272, depending upon the digit representing position of the related accumulator element 172. It will be obvious that in the 0 digit representing position of the accumulator element 172 shown in Fig. 4a the brush 273 engages the 0 contact bar 272. If the accumulator element is moved to the 1 digit position, the brush 273 will make contact with the 9 digit bar, etc. Stated in other words whatever the digit position of an accumulator element may be the brush 273 of the readout will make contact with a bar 272 which has a digit value, corresponding to the tens complement. The brush 273 is carried by a common conductor ring 274 which is insulatably carried by the pinion 270 and bearing against the conductor ring 274 is a brush 275. By suitable plug connections made to the brush 275, each accumulator order may be connected for recording control.

*Card feeding and analyzing devices*

The card feeding and analyzing devices employed for the present machine are similar in construction and operation to the form disclosed in the patents to J. R. Peirce, No. 1,827,259, dated October 13, 1931; No. 2,042,324, dated May 26, 1936; and No. 2,199,547, dated May 7, 1940. For a more complete understanding of this mechanism, reference may be had to these patents.

Figure 2:
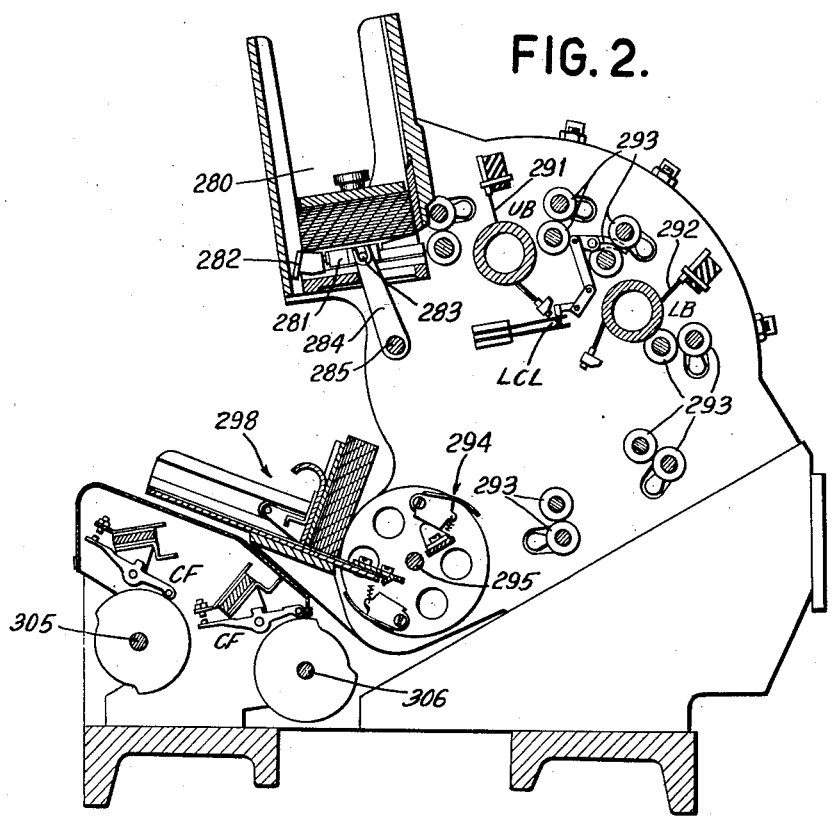
Fig. 2 is a sectional view taken on the line 2—2 of Fig. 1 at the left end of the tabulating machine, showing the preferred form of card feeding mechanism for the machine.
Figure 3:
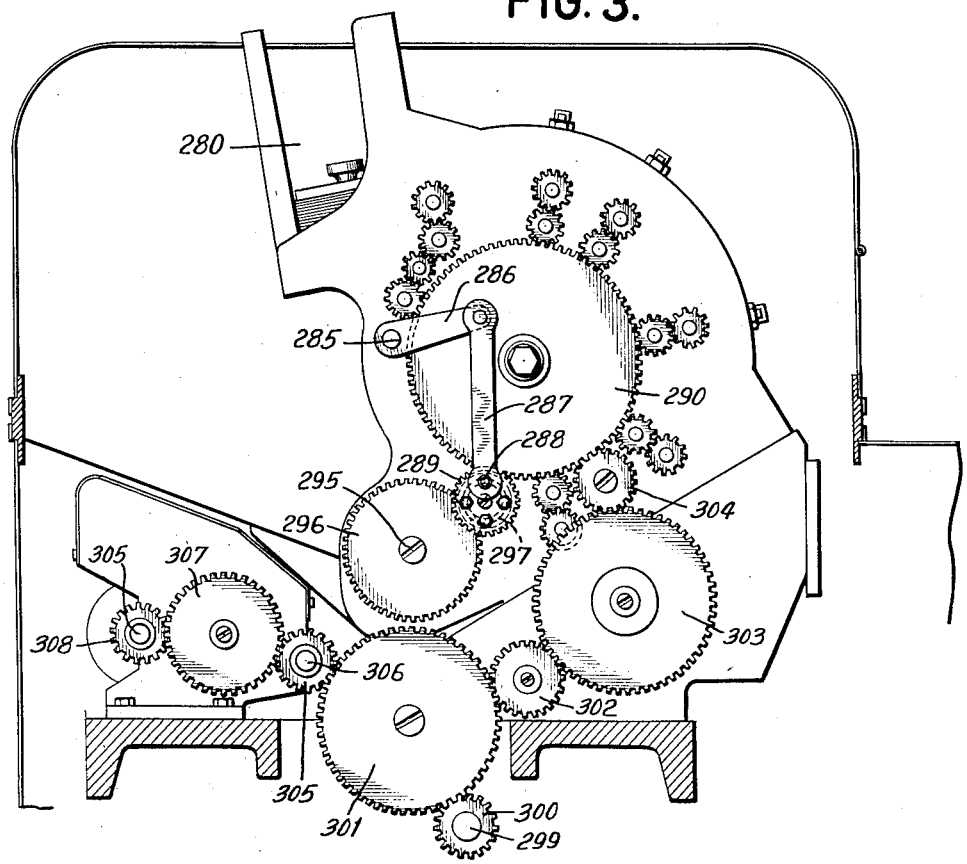
Fig. 3 is a sectional view taken on the line 3—3 of Fig. 1, showing particularly the driving mechanism for the card feeding rollers and stacking mechanism.
Figure 3A:
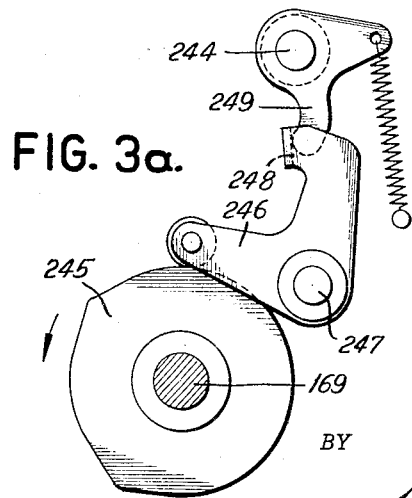
Fig. 3a is a detail view.

The card feeding mechanism is shown generally herein in Figs. 2 and 3 and referring to Fig. 2 the record cards are fed singly from the supply magazine 280 by the usual card picker mechanism comprising a slidably mounted reciprocable plate 281 carrying a picker knife 282 for cooperation with the record cards. The plate 281 has a pin and slot connection 283 with an arm 284 secured to a shaft 285 which carries at its end an arm 286 (see Fig. 3) connected by a link 287 to a stud 288 mounted eccentrically on a pinion 289 and meshing with a ring gear 290. Each reciprocation of the picker knife 282 causes the card to be fed from the magazine to the analyzing mechanism and the card is presented in succession to the UB analyzing brushes 291 and the LB lower analyzing brushes 292.

The feeding of the record cards from station to station and to ejection is effected by pairs of rollers 293 (Fig. 2) having the customary driving gear connections to the gear ring 290 (see Fig. 3). The cards pass from the last pair of rollers 293 to a card stacker mechanism 294, that shown being of the rotary type. The drive shaft 295 for the rotary stacking mechanism has attached thereto a gear 296 (Fig. 3) meshing with the pinion 297 rotatable with the aforementioned gear 289. The cards are fed to a storage magazine 298 in the same order they were in originally. Referring to Fig. 3 a constantly running shaft 299 driven by main drive shaft 10 through any suitable interconnecting means drives a pinion 300 which drives a gear 301 and through a series of interconnected gears 302, 303 and 304 the ring gear 290 is rotated to operate the card picker, drive the card feeding rollers, and the card stacker mechanism. The usual form of magnetically controlled clutch (Fig. 6, Patent No. 2,042,324) is interposed between the constantly rotating shaft 299 and the gear 300, this clutch being controlled by the well known card feed clutch control magnet 315, Fig. 19a (magnet 48 of Fig. 6, Patent No. 2,042,324) to which a more specific reference will be made when the operation of the machine is described in connection with the circuit diagram.

The machine also includes a single card lever which is positioned to control various functions of the machine which will be described in connection with the wiring diagram. Such card lever and contacts and their operation are fully known and reference may be had to the aforementioned patents for a more complete disclosure. At this time it should be noted that when a record card has passed the UB analyzing brushes it closes contacts LCL.

Cam contacts

As is usual in the form of card controlled machine in which the present improvements are incorporated, the machine also includes cam operated contacts of two types, namely, CF contacts operated during card feeding operations and the other or the CR contacts which are contacts operated by constantly running cams in the machine. The drive for the card feed contacts CF (see Fig. 2) comes from the gear 301 (Fig. 3) which drives the pinion 305 attached to a shaft 306 which carries a series of cams for operating some of the CF contacts. The pinion 305, through an idler gear 307, drives a pinion 308 secured to a shaft 305 which drives the cams controlling the remaining CF contacts. The CF cam contacts used in the present machine have the timing shown in Fig. 18.

Any suitable constantly running shaft which rotates one revolution for each machine cycle may be utilized to operate the CR cam contacts which have the timing shown in Fig. 18. A suitable shaft for such operations may comprise the shaft 299 (Fig. 3) which it will be recalled is one of the constantly rotating shafts of the machine.

Circuit diagram

The operation of the machine will now be described in connection with the circuit diagram comprising Figs. 19a and 19b.

The operation of the machine is initiated by depressing a start key to close contacts 311, the circuit extending from the line 310 connected to a grounded power supply G, thence by line 312, through stop key contacts 313 now closed, start key contacts 311 now closed through grounded relay coil R12. The latter closes its stick contacts R12A, the stick circuit extending back to line 310 through relay contacts R12A and R1B. Relay coil R12 now being energized will close its contacts R12B, thereby closing a circuit from line 310, wire 312, through cam contacts CR6, relay contacts R21A now closed, relay contacts R12B now closed, to the grounded pickup coil of relay R11, causing the energization of relay R11 when cam contacts CR6 close. Relay R11 will close its stick contacts R11A, the stick circuit for the hold coil of relay R11 extending back through relay contacts R11A, cam contacts CR5 and wire 312 back to line 310. Cam contacts CR5 will hold the energization of the relay R11 to 360° of the machine cycle. Relay coil R11 will close its contacts R11B closing, when cam contacts CR6 close at 274° of the machine cycle, a circuit from the line 310 and wire 312 through relay contacts R11B now closed to the grounded card feed clutch magnet 315. The impulse transmitted to the card feed clutch magnet will clutch the card feeding mechanism to its driving shaft and a card feeding operation will ensue for one cycle, thus feeding the lowermost card from the magazine to a position where the leading edge is in juxtaposition to the UB analyzing brushes 291.

During the first card feeding cycle when cam contacts CF11 close at the "5" point of the machine cycle, said contacts will close a circuit from the line 310, through relay contacts R7B now in the position shown, through cam contacts CF11 to the pickup coil of relay R1. The pickup coil closes its contact R1C to energize the hold coil of relay R1, which is held energized through cam contacts CF19. Energization of relay coil R1 will open its contacts R1B, thereby opening the stick circuit for relay coil R12 which, upon deenergization, will open its contacts R12B. Hence, when cam contacts CR6 close, an impulse cannot be sent to relay coil R11 and card feed operations terminate after the first card feed cycle.

At the "5" point of the cycle relay coil R1 is energized as has just been described. Relay coil R1 will thereupon open its contacts R1A, opening the impulse circuit leading to the analyzing brushes 291 preventing the circuit breaker contacts CR1 and CF7 from transmitting unwanted impulses to the analyzing brushes 291 if such brushes were plugged up for control operations and which would cause improper operations in the absence of a card passing by the analyzing brushes 291.

A second card feed cycle is initiated by a redepression of the start key 311 so as to again transmit in the manner just described a second impulse to the card feed clutch magnet 315 and a following card will be fed out of the magazine and the leading card will pass by the upper brushes 291 and into such position that the card lever is operated to close card lever contacts LCL.

A card is fed during the second card feed cycle so as to close card lever contacts LCL and such contacts are closed when cam contacts CF8 close at 207°, and an impulse will be directed to grounded relay coil R3. The relay coil R3 closes its contacts R3C and an alternate circuit extends back by wire 312 to line 310 through cam contacts CF9. If card lever contacts LCL are closed when cam contacts CF9 are open, relay coil R3 will be held energized, the energization of the latter then being effected through the card lever contacts LCL and cam contacts CF8. When relay coil R3 is energized it will close its contacts R3A, thus connecting the contact roll of the LB analyzing brushes 292 to the circuit breakers CR1 and CF7. As long as card feed operations continue LCL contacts will remain closed to maintain the energization of the relay coil R3 and the closure of its contacts R3A, rendering the LB analyzing brushes 292 effective. It will be understood that during the first two card feeding operations contacts R3A will be open, rendering analyzing brushes 292 ineffective but by the circuit connections just described the analyzing brushes 292 will be effective to analyze the card during the third analyzing cycle.

During the first card feeding cycle when cam contacts CF3 close at 108°, a circuit is closed from line 310, wire 312, through cam contacts CF3 to the grounded pickup coil of relay R6. Relay coil R6 closes its stick contacts R6A and a stick circuit is provided for hold coil of relay R6 through contacts R6A and cam contacts CF10 which are closed to retain the energization of relay R6 until 280° of the card feed cycle. Relay coil R6 closes its contacts R6B and when cam contacts CF18 close at 263° of the machine cycle before cam contacts CF10 open a circuit will be closed from the line 310, wire 344, cam contacts CF18, through relay contacts R6B now closed to the grounded pickup coil of relay R7. The latter closes its stick contacts R7A and the stick circuit for the hold coil of relay R7 extends back through cam contacts CF18 to the line 310. Cam contacts CF18 will retain the energization of relay coil R7 for the greater part of the next card feed cycle. The energization of the relay coil R7 will transfer its contacts R7B, opening the circuit between the line 310 and cam contacts CF11, thus preventing an impulse from being transmitted to relay coil R1 when such contacts CF11 close at 76° of the next or second card feed cycle.

After the second card feed cycle, successive card feeding cycles automatically ensue as long as cards are fed. When relay contacts R7B transfer, cam contacts CF11 are in series connection with a special brush 291' of the analyzing brushes 291 and a passage of the marginal edge of the card between such brush and contact roll will prevent an impulse from being transmitted through transferred contacts R7B when cam contacts CF11 close. Hence, during the second card feed cycle, the card passes between the special brush 291' of the analyzing brushes 291 and the associated contact roll, thereby opening the impulse circuit at this point to relay coil R1, even though cam contacts CF11 close at 76° and since such cam contacts are unable, at this time, to transmit an impulse to relay coil R1, relay contacts R1B will remain closed so as to retain the energization of relay coil R12. Attention is directed to the provision of cam contacts CF12 which are in multiple connection with the relay contacts R11B and such cam contacts are open between 292° and 352° of each card feeding cycle. Since relay contacts R1B remain closed relay coil R12 will remain energized and the impulse directed by cam contacts CR9 will pass to the pickup coil of relay R11 and the energization of the latter will be retained by the cam contacts CR5 and such contacts are timed to overlap the time cam contacts CF12 are open. By closing relay contacts R11B during this time the card feed clutch magnet will be retained energized. In this manner, card feeding cycles automatically ensue after the second card feeding cycle is manually initiated.

Card feeding operations may be manually terminated by depressing the "Stop key" to open stop key contacts 313, thereby opening the stick circuit for the relay coil R12 and deenergization of the latter will open contacts R12B, preventing the relay coil R11 from being picked up when cam contacts CR9 close and thus the failure to close contacts R11B to transmit an impulse to the card feed clutch magnet 315 will terminate card feeding operations at the end of the card feed cycle in which the "Stop key" was depressed.

*Control circuits for effecting entry of credit items negatively*

It will be recalled that in the present machine credit items as they occur on the successive tabulating cards are entered in the accumulator negatively and the accumulator actuating mechanism is conditioned for effecting entries negatively by transmitting an impulse at 336° at the end of the cycle preceding the negative entry cycle. Credit items are not designated on the cards and a normally operative control circuit is effective for causing negative entries as will now be described in detail.

The circuit diagram in Fig. 19b only shows the entry circuits for four denominational orders and it will be assumed that these four orders are utilized for deriving a balance of the credit and debit items. The accumulator orders are arranged to provide a unit by interconnecting plug connections 325 which are received by a series of plug sockets 330. A plug connection 328 is also made from one of the plug sockets 330 to the plug socket 329.

At 336° of the machine cycle, cam contacts CR41 and CF26 (Fig. 19b) are both closed, closing a circuit from the line 310 through cam contacts CR41, cam contacts CF26, thence through relay contacts R28A now closed, to the plug socket 329, thence by the plug connection 328 to the series of interconnected plug sockets 330, thence through entry control contacts 333 which, at the time of the impulse emitted by cam contacts CR41 and CF26, are all in the position shown so that the impulse will be directed through the closed contacts thereof to the grounded control magnets 195 for each denominational order.

This will condition the accumulator actuating mechanism for each of the orders so that upon the beginning of the entry part of the next cycle all of the accumulator elements will begin to rotate and will rotate until impulses are transmitted from the adding control brushes 292. The circuit for transmitting such impulses will be later described in detail.

*Control circuits for effecting entry of debit items additively*

It will be remembered that in the present machine debit items are entered additively and the accumulator actuating mechanism is conditioned in the cycle preceding the additive entry of the debit items by transmitting an impulse at 354°. For conditioning the accumulator actuating mechanism to add items, each debit item representing card is perforated at the X index point position of the selected card column used for control purposes. One of the upper brushes 291 pertaining to the controlling card column which is to be perforated at the X index point position of the debit item representing card is plugged by a plug connection 341 to a plug socket 342. When the hole at the X index point position is analyzed, a circuit is closed from the line 310 through circuit breaker contacts CR1 and CF7 which are closed when the X index point position is analyzed, thence through relay contacts R1A now closed, the contact roll of the UB analyzing brushes 291, the analyzing brush 291 for the controlling card column, plug connection 341 to plug socket 342, thence through cam contacts CF20 closed at the time the X index point position is analyzed to grounded relay coil R131. Relay coil R131 now being energized closes its stick contacts 131A to energize the hold coil of relay R131, the stick circuit for the hold coil of relay 131 extending back through relay contacts 131A, through cam contacts CF17 and wire 344 back to the line 310. This will retain the hold coil of relay R131 energized until 273 degrees of the machine cycle. At about 230° of the machine cycle cam contacts CF21 close to pick up a relay coil R132, the circuit being from the line 310, wire 344, cam contacts CF17 now closed, relay contacts 131A now closed, to the grounded pickup coil of relay R132. Relay coil 132 will close its contacts 132A, thereby causing the energization of the hold coil of relay R132 by a circuit extending from line 310, wire 344, cam contacts CF18, relay contacts R132A to the hold coil of relay R132. Hence, before cam contacts CF17 open at 273° to deenergize the pickup coil of relay R132, cam contacts CF18 close at 263° so as to continue by the closure of cam contacts CF18 the energization of the hold coil of relay R132 to the end of the cycle and for a greater part of the next cycle. When relay coil R132 energizes it transfers its contacts R132B. (Fig. 19b.)

At about 354° of the machine cycle cam contacts CR34 close, thereby closing a circuit from the line 310, through cam contacts CR34, through relay contacts R28B now in the position shown to the plug socket 352. A plug connection 353 made from the plug socket 352 to the plug socket 354 extends the circuit connection through relay contacts R132B to the plug socket 327 and thence by the plug connection 326 the impulse is directed to control magnets 195 of all denominational orders of the accumulator. The impulse directed at this time to the control magnets 195 will condition the accumulator actuating mechanism for the entry of the debit items additively in the manner previously described in detail.

*Entry circuits controlled by LB brushes 292*

When a card passes by the LB analyzing brushes 292, impulses are directed to the print control magnets 61 for listing of items represented by the tabulating cards, to terminate complementary entries when credit items are entered, and to initiate the entry of items additively when the tabulating cards represent debit items. The analyzing brushes 292 which analyze the field representing such items have plug connections 360 from the corresponding plug sockets to plug sockets 362 of the denominational orders utilized for listing and for the accumulator entry. It will be noted that each of the plug sockets 362 has a wire connection to the upper contact blade 363, and the intermediate contact blade 364 for each denominational order has a wire connection 365 to the related printing control magnet 61. Associated with each intermediate contact blade 365 is the lowermost contact blade 366. For each order, the position of contacts 363, 364 and 366 is controlled by a related cam 367 driven by the shaft 299 to cause the cam to be rotated synchronously with the CF and CR contacts. The profile of each cam 367 is so arranged that during the time the 9 to 1 index point positions are analyzed the lowermost blade 366 will make contact with the intermediate contact blade 364 and the latter in turn will make electrical contact with the uppermost contact blade 363. During the time that 9 to 1 index positions are being analyzed the impulse from one of the analyzing brushes 292 is transmitted from a plug socket 362 through contact blades 363, 364 and wire 365 to the related print control magnet 61. This impulse will initiate the rotation of the associated printing wheel and at the time the type selecting clutch is engaged the accumulator element will be initiated in operation when the item is to be entered additively but its operation will be terminated when the entry of the 9 complement has been effected.

*Item listing circuits controlled by LB brushes 292*

The transmission of impulses to print control magnets 61 to initiate the differential rotation of printing wheels 60 has just been described and such wheels are differentially rotated to digit positions 1-9, depending upon the hole analyzed. For those orders either to the right of a significant digit or higher orders to the left of the highest order significant digit, where a 0 is represented no rotation of the printing wheel in that order occurs. However, an impulse will be directed to the print control magnet 61 at the time that the projection 66L (Fig. 4) is over the extension of the related clutch release arm 87, so as to render the printing clutch effective to cause printing from the 0 type on the wheel 60. This zero printing is described in a subsequent chapter under the heading "Zero insertion and suppression control for item and total printing."

For those denominational orders in which printing of digits 1-9 is to occur, a second impulse is directed to printing control magnet 61 of such orders at the N time in the printing cycle to cause the engagement of the printing clutches to effect printing from the selected numeral type. This circuit (Fig. 19b) extends from the line 310, cam contacts CR25, contacts R89C now closed, plug socket 394, plug connection 395, plug socket 396 which has interplugging connections to all of the contact bars 140. For each denominational order in which a digit 1-9, inclusive is to be printed in printing an item, the contact bar 138 will be in such position that it will electrically shunt contacts 140 and 141, thereby transmitting the impulse from cam contacts CR25 through 140, 138, 141 to the related print control magnet 61. This impulse is made at 225° of the item printing cycle to engage the printing clutches of all orders utilized in printing an item.

*Units carry circuit*

The mechanical and electrical parts of the units carry mechanism were previously described in detail and at this time the control circuit for transmitting the carry control impulses at 243° will now be described. Such impulses are directed by cam contacts CR46, the circuit extending from the line 310, cam contacts CR46, relay contacts R89B now closed, thence to the contact blades 267 of all the denominational orders and thence under control of the shifted contact blade 265 for each lower denominational order to the next higher denominational order control magnet 195 through the associated contacts 333 which are now transferred. At the carry impulse time a cam 370 driven by the shaft 299 transfers the contacts 333 (Fig. 18), thereby placing each of the control magnets 195 of higher order in a circuit with the lower order units carry control contacts.

In order to effect the entry of the tens complement of the digit entry in the lowest denominational order, a plug connection 371 is made from a plug socket 372 to a plug socket 373. In the present machine, when the highest order accumulator element passes from 0 to 1 its carry contacts are shifted to close contacts 265, 267 so that the carry impulse will be directed to plug socket 372, the plug connection 371 to the plug socket 373, thence through the transferred contacts 333 of the units denominational order to the control magnet 195 for the units denominational order, thereby augmenting such order by a unit.

If the readout and accumulator had the same digit relationship, carries would be effected when each accumulator order passes from 9-0, as in prior practice. Because the readout herein has a digit representing position which is the tens complement of the digit represented in the accumulator order, carries are effected when a lower accumulator order passes from 0-1 in any entry, subtractive or additive, and obviously are required to obtain the proper digit representation in the next higher accumulator order and the companion readout order. This is clear from the computation examples of Fig. 1a where the unit carries are significantly expressed.

Provision is also made herein to effect the so-called "carries by carries," operable herein to advance each next higher order wheel if it is at zero when the lower order wheel passes from 0 to 1 which, in the present arrangement, is the time when carries are to be initiated. Referring to Fig. 4a, when each carry control cam 260 is at the 0 digit representing position, carry arm 262 will rest against the lowest portion 260a of the carry control cam 260, in which position contact blade 265 is in electrical contact with contact blade 266. Assuming that the units order receives an entry to rotate carry control cam from the 0 digit position to the 1 digit position, carry arm 263 will be rocked in the manner previously explained to cause contact blade 265 to make contact with the contact blade 267. Referring to Fig. 19b, this enables the transfer impulse to pass to the tens accumulator control magnet 195. If the tens and hundreds order should be at the 0 digit representing position, this same impulse will branch from the contact blade 265 of the units order to the contact blade 266 of the tens order which is now in contact with the contact blade 265 of the same order. This impulse will then be directed through the transfer contacts 333 to the hundreds order control magnet 195. If successive higher orders are also at the zero digit representing position, this impulse will be serially transferred to the control magnets 195 of such orders. Thus, provision is made to effect carries on carries to succeeding higher orders when required.

*Circuit connections for alphabetic listing*

In the description of the printing mechanism, it was stated that provision is made for alphabetic printing under control of tabulating cards which are perforated according to the code in Fig. 4b for the selection of the alphabetic type. The particular columns which are so perforated are analyzed by the LB brushes 292 and for listing of the alphabetic data, plug connections are made from the brushes to the corresponding plug sockets 368. Of course, if plug connections are made to plug sockets 362 for numeric listing and accumulation, the plug sockets 368 of the same orders will not be utilized for alphabetic printing since one or the other can be effected but not both. Since the control magnets 195 are not utilized for alphabetic printing, plug connections to them are omitted when the associated card columns are plugged up for alphabetic printing. The cam 367 for each order is also provided with a supplemental high portion 369 which shifts the lower contact blade 366 to make contact with the intermediate contact blade 364 during the analysis of the R, X and 0 perforations. Hence, when plug connections are made to plug sockets 368, the print control magnets 61 will receive the additional impulse at the R, X and 0 index point positions, thereby selecting the desired alphabet type of the group selected by the numerical index point position. Of course, the rotation of the cam 367 by drive shaft 299 is synchronous with the positioning of the interposers 65 (see Fig. 4) so as to provide the desired operation.

The accumulator entries for orders used solely for alphabet, or numeral printing without numeral entries is suppressed by mechanism normally operating as a result of the non-energization of magnets 195 for such orders. Thus, the upward movement of bail 203 (Fig. 4a) to its maximum extent will enable the control members 202 to be rocked counterclockwise (Fig. 4a) the full extent so that a projection 385 thereof catches over a projection 386 of the related accumulator control arm 174. Hence, all the accumulator control arms will be locked against movement. Further, the link 204 is shifted to the left to such position that it rocks link 207 about stud 210 (Fig. 4) to disconnect projection 212 from the stud 211 (Fig. 4a) and to disconnect hook portion 208 from the stud 209 (Fig. 4) carried by the associated double arm 132. This condition effectively prevents arm 132 from operating the link 204, and renders arms 132 ineffective for accumulator entries even though rocked when either alphabet or numeral type are selected for printing.

With the arrangement of the contact blades 363, 364 and 366 and their operation by cam 365, it is also made clear that when the plugging connections 360 are made to the plug sockets 362 the cam 367 will only make contact between contact blades 363 and 364 during the analysis of the 9-1 index point positions and when the 0 index point position is analyzed the presence of a perforation at such index point position will be ineffective to transmit an impulse to the print control magnet 61. For numeric listing, the zero printing is effected by the zero insertion and zero suppressing mechanism and without the energization of the print control magnet 61 upon analyzing a 0 perforation the unnecessary operation of the links 207 will be eliminated. The circuit for transmitting the impulse at the "N" time for numeric listing will be later described.

*Automatic group control device*

In the class of machine now being described, record cards are usually grouped according to transactions, commodities, salesmen's identifications, etc. In such instances the cards of each group are given special designations that usually take the form of numbers perforated in certain columns of the card. These group representing designations are utilized to control the machine so that when the last card of a group and the first card of the next group concurrently pass through the machine the machine may be conditioned to print the total of the group. Such arrangement is also included in the present machine to take a total or balance. The automatic group control device is of a conventional arrangement.

From Fig. 19a it will be observed that by way of example two card columns of the upper brushes UB and two corresponding card columns of the lower brushes LB are plugged up for automatic control. Plug connections 375 are made between the plug sockets for the UB analyzing brushes and plug sockets 376. Plug connections 377 are also made between the plug sockets of the corresponding card columns of the LB analyzing brushes and plug sockets 378. By reason of the plug connections 375, impulses under control of the card passing the UB analyzing brushes will transmit impulses to grounded pickup coils of relays R41 and R43. Impulses from the LB analyzing brushes will be transmitted by the plug connections 377 to grounded pickup coils of relays R40 and R42. Each pickup coil of relay R40, R41, R42, R43 will close its contacts R40A, R41A, R42A, R43A to energize its H hold coil which is retained energized during the entry cycle by cam contacts CF14. The automatic group control circuit extends from line 310 through circuit breaker contacts CR9, thence serially through the relay contacts R40B and R41B, or alternately serially through relay contacts R42B and R43B, thence by a wire connection 380 to the grounded pickup coil of a relay R8.

Obviously, if relays R40 and R41 are impulsed at the time the same numerical designation is sensed by the UB and LB analyzing brushes, the corresponding relay contacts R40B and R41B will be simultaneously transferred so that at this index point position when the circuit breaker CR9 transmits an impulse the impulse cannot be sent to relay coil R8 due to the open circuit. However, if either relay R40 or R41B is energized at the time the other relay is deenergized the impulse will be directed by circuit breaker CR9 to the relay R8, thus causing the energization of the latter to condition the machine for a balance total taking operation. While the control has been described for one column it is obvious that the control for the other card column is similar in operation and that a dissimilarity in designation for either card column will initiate a balance total taking operation by energizing relay R8. The pickup coil of relay R8 will close its contacts R8A to energize the hold coil of relay R8, the stick circuit for the latter extending through contacts R8A and cam contacts CF19 back to the line 310. Cam contacts CF19 are closed during the analysis of the 9 to 1 index point positions and upon a change in group designations relay coil R8 will be picked up and held energized by cam contacts CF19 until 285° of the card feed cycle in which the change in designation was sensed. When relay coil R8 is energized it will close its relay contacts R8B and when cam contacts CR12 close at 210° of the card feed cycle in which a change in designation occurs a circuit will be closed from line 310 through cam contacts CR12, relay contacts R3B now closed, relay contacts R8B now closed, to grounded relay coil R21. Relay coil R21 closes its stick contacts R21B, thereby causing the energization of the hold coil of relay R21, the circuit extending back through relay contacts R21B, normally closed relay contacts R35D, back to line 310. At about 286° of this machine cycle cam contacts CR51 close and such cam contacts maintain the stick circuit for R21 relay until about 260° of the next machine cycle, which is a total taking cycle.

One function of the relay coil R21 is to cause the stopping of the card feeding operations to prevent card feed during the machine cycle a total is taken. To this end the energization of relay coil R21 opens its contacts R21A (Fig. 19a). With contacts R21A open, an impulse cannot be directed by cam contacts CR6 to relay coil R11 to close its contacts R11B. Hence, the circuit to the card feed clutch magnet 315 will be opened after cam contacts CF12 open and card feeding operations will terminate.

*Total switch plate*

When a total is to be taken from the accumulator and the total or balance is to be printed it is necessary to close the total taking control circuits and in the present machine a total switch plate or an electromagnetically controlled relay is utilized to cause the closure of contacts 381 for each denominational order of the accumulator. The closure of such contacts 381 effects the closure of total taking circuits between the printing control magnets 61 and the readout for the accumulator. The means for causing the closure of such contacts is well known in the type of machine now being described and is fully shown and described in the patent to A. W. Mills, No. 2,079,418, dated May 4, 1937, and in Fig. 12 thereof with the attendant description. The preferred form of electromagnetically controlled relay consists of a magnet TM which, upon its energization, causes the shifting or closure of contacts 381 herein. These contacts remain closed during the total taking cycle and by means of a cam driven by a one-revolution shaft operable during the total taking cycle the contacts are mechanically restored to their normal or open positions.

While the Mills patent shows a relay having more contacts than are used herein the normally open contacts in the patent and shown in the circuit diagram herein as contacts 381 are wired in the present machine according to the circuit diagram herein. Otherwise the operation of the total switch plate is the same as described in the Mills patent. The circuit for energizing the TM magnet to cause the closure of contacts 381 will now be described in detail: At 280° of the card feed cycle in which a change of designation is sensed and upon the closure of cam contacts CR11 (Fig. 19a), a circuit will be closed from the line 310 by wire 382 through cam contacts CR11, thence through relay contacts R21D, now closed, to the TM total switch plate magnet. The total switch plate control magnet is also designated "TM" in the Mills patent and by transmission of an impulse to such magnet, contacts 381 will be closed and will remain closed during the total taking cycle.

*Taking of a positive credit balance*

In order to illustrate how the present machine is capable of recording either a positive or negative credit balance it will first be assumed that the machine is to record a positive credit balance which is a total of accumulator entries of values when the credit items numerically exceed the debit items. This example is illustrated in Fig. 1a.

In the first credit entry of -0345- with the accumulator at zero, an entry of 9654 is shown, this being changed in the accumulator after unit carries to the tens complement of each digit of the credit amount, resulting in the representation on the accumulator as 0765. In the accumulator a debit value of 0210 is then additively entered, the balance being represented in the accumulator as 0975. Obviously, the subtraction of 0210 from 0345 should give a positive credit balance of 0135 which amount should be printed as a total and such amount is printed under control of the readout associated with the accumulator shown in Fig. 4a and diagrammatically in Fig. 19b of the wiring diagram. In the units order the accumulator element has been turned five steps from the 0 representing position in a counterclockwise direction, causing five steps in a clockwise direction of the associated gear 270 so that brush 273 is now in contact with the 5 digit bar 272. The tens order accumulator element has turned seven steps in a counterclockwise direction from zero and the related gear 270 has turned seven steps in a clockwise direction, causing the related brush 273 to be in contact with the 3 digit bar 272. For the hundreds order the accumulator element has turned nine steps in a counterclockwise direction from zero, the gear 270 nine steps in a clockwise direction, and its brush 273 is now in contact with the 1 digit bar 272. The highest order accumulator element is in a position shown in Fig. 4a and the associated gear 270 is in such position that the brush 273 is in contact with the 0 bar 272. While such 0 bar is shown in the wiring diagram it does not control the transmission of impulses in printing a positive balance.

During the beginning of the total taking cycle the bar 203 (Fig. 4a) is elevated in the manner previously described but in view of the fact that none of the control magnets 195 has previously been energized the related member 193 will not engage either projection 201 or 216 of the control members 202 and the bail 203 will permit each of the control members to be rocked counterclockwise to its maximum extent enabling a projection 385 thereof to catch over a projection 386 of the related accumulator control arm 174. Hence, at the beginning of the total taking cycle all of the control arms 174 will be locked against movement if the total is to be retained on the accumulator. Therefore, when a total is to be taken from the accumulator and the amount is to be retained on the accumulator the control arms 174 will be locked against movement and the accumulator elements and associated readout brushes 273 will be retained at their previously set positions. For causing the accumulator readout to control total printing operations, plug connections 387 are made between plug sockets 389 and 388 which latter are electrically connected to the collector brushes 275. An impulse distributor 390 is driven by the shaft 299 and has a wire connection 391 to the line 310 through CR1 circuit breaker contacts (Fig. 19a) and such impulse distributor and circuit breaker are adapted to transmit digit representing impulses to the bars 272 in the order 9 to 1, it being observed that for the units order the brush 273 in the example assumed electrically contacts the 5 digit representing bar 272 to transmit through the related plug connection 387 an impulse through the associated contacts 381 now closed to the related print control magnet 61 to select the 5 type. For the tens and hundreds orders impulses are transmitted at the 3 and 1 times to the printing control magnets 61 of the tens and hundreds orders to select the 3 and 1 type. The impulses from the impulse distributor 390 to the bars 272 pass through the normally closed contacts R37A-1 of the relay R37, it being observed that the 0 digit bar 272 does not have any connection to the impulse distributor due to the normal opening of the relay contacts R37A in series with the 0 digit bar 272. Hence, while the highest order readout brush 273 contacts the 0 bar 272 in the present example, no impulse will be transmitted to the printing control magnet 61 of the highest order and printing of zero in this order will be suppressed.

Summarizing, each accumulator element will cause its associated readout brush 273 to make contact with a digit bar 272 which is the tens complement of the particular digit represented by the accumulator element, whereby by virtue of such relation the readout will cause the printing of digits each of which is the tens complement of each digit representation of the accumulator element. Hence, a debit balance of 0975 will be printed as 135 during a total printing operation.

It will be recalled that for item listing operations a supplemental impulse is directed to the printing control magnets 61 at the N time in the item entering and printing machine cycle to cause the engagement of the printing clutches to effect printing from the selected numeral type. (See Fig. 4.) It is preferable to provide the same source for this impulse when printing totals by the type selected under control of the readout for printing digits 1–9, inclusive. This circuit (Fig. 19b) extends from the line 310, cam contacts CR25, contact R39C now closed, to a plug socket 394. A plug connection 395 is made between plug socket 394 and plug socket 396 which has interplugging connections to all of the contact bars 140. For each denominational order in which digit 1–9 inclusive is to be printed in printing a total, the contact bar 138 will be in such position that it will shunt contacts 140 and 141, thereby transmitting the impulse from cam contacts CR25 through 138, 140, 141 to the related print control magnet 61. This impulse is made at 225° of the total printing cycle to engage the printing clutches of all printing orders utilized in printing a total.

*Zero insertion and suppression control for item and total printing*

If zeros are to be inserted for intermediate orders, or successive zeros to the right of the first significant digit, either for listing of items or printing a total, this will be effected by the following circuit.

It will be recalled that for item listing operations while 0 may be represented in certain columns by a hole at the 0 index point position, impulses will not be transmitted to the printing control magnets 61 to cause the engagement of the printing clutches because, at this time, referring to Fig. 18, contacts 363—364 (Fig. 19b) are not closed by cam 367 and thus the circuit to the print control magnet 61 will be open at the time the 0 holes are analyzed. In the preceding description it was also stated that zeros represented in the readout do not control zero printing. The printing of zeros in orders to the right of the significant digit of the highest denominational order and the suppression for denominational orders to the left for item and total printing are effected by the mechanism now to be described.

Referring to Fig. 4 it will be recalled that for zero representing orders to the right of the first significant digit the contact bars 138 are in the position shown in Fig. 4 and Fig. 19b and when the zero print bail 144 moves to the left, contact points 141 and 162 will be electrically shunted by the contact bar 138. Assuming that the amount 4,000 is to be printed, the contact bar 318 related to the thousands order will be in position to shunt electrical contacts 140 and 141 and accordingly the impulse directed by cam contacts CR25 will be transmitted through such contacts 140, 141 now shunted by contact bar 138 and then to the print control magnet 61 for the thousands order as previously described. By means of a plug connection 399, this same impulse is directed to the print control magnet 61 for the hundreds order through contacts 162 and 141 of the hundreds order now shunted by the contact bar 138. In the same manner by the other plug connections 399 for the next lower 0 representing orders, it will be seen that the same impulse is transmitted to the print control magnets for such orders. This "N" impulse transmitted to the print control magnets for one or more orders to the right of the first significant digit will cause zero printing in such orders.

*Concurrent reset of accumulator with total printing operations*

It is desirable to reset the accumulator to zero during the total taking and printing cycle and means for effecting a concurrent reset operation will now be described. At the end of the cycle in which a change in designation occurs with relay contacts R21C (Fig. 19b) now closed, a circuit is completed from the line 310, through relay contacts R35C, now closed, thence through relay contacts R21C now closed, and cam contacts CF28 to grounded relay coil R28. Relay coil R28 closes its contacts R28C and the circuit extends through such relay contacts and cam contacts CR29 and also relay contacts R35C in shunt with cam contacts CR20, back to the line 310. For selective concurrent accumulator reset operations with total printing operations a plug connection 397 is made between a plug socket 398 and one of the sockets 330. It will be recalled that when a credit amount is entered in the accumulator each digit thereof is entered as a nines complement and this is effected by transmitting an impulse to the control magnets 195 to condition the accumulator actuating mechanism for such entry operations. Preferably an additional source of impulse is provided to transmit the impulse to the control magnets 195 in accumulator resetting operations and the circuit for providing such source of impulse extends from the line 310, through cam contacts CR34, relay contacts R28B now transferred, to the plug socket 398, plug connection 397 to one of the plug sockets 330, thence through the contacts 333 now in the position shown to the control magnets 195. The energization of such magnets will, in the manner previously described, cause the accumulator control arms 174 to be latched at the beginning of the total printing cycle.

During this cycle, as previously explained, impulses are transmitted under control of the accumulator readout to the print control magnets 61 to initiate the rotation of the printing wheels 60 at differential times which are the tens complement of the accumulator digit representation in each order. It is obvious that the engagement of the type selecting clutch will cause, as previously described, the elevation of the link 207, thereby unlatching the accumulator control arms 174 shortly after the initiation of the rotation of the type wheel. The release of such accumulator control arms 174 will cause the engagement of the idler gear 175 with the fluted driving shaft 165. Each accumulator wheel will be turned one or more steps corresponding to the tens complement of the digit representation. For example, in printing the accumulator representation 0975 as a balance 0135 the accumulator wheel for the lowest denominational order will rotate five steps to the end of the entry part of the cycle bringing such accumulator element to zero. The tens order wheel is at 7 and at the 3 impulse time the related accumulator control arm 174 will be unlatched and the accumulator element will be rotated to the end of the entry part of the cycle to turn it three steps, bringing such accumulator element to zero. The hundreds order will, in the same manner, receive a rotation of one step to bring it to zero. The highest order wheel will not be rotated since its accumulator control arm 174 will remain in latched position during the total printing cycle so that it will still represent zero.

*Total printing of negative credit balances*

In the example outlined in Fig. 1a it was assumed that the credit amount numerically exceeded the debit amount which gave a positive credit balance. If the debit amounts numerically exceed the credit amounts this would give a negative credit balance and since the balance is not indicated in true figures in the accumulator, the negative balance should be converted and printed as a true amount to be readily identified as to its numerical value. To make the operation of the machine more clearly understood when such conditions occur, it will be assumed in the example of Fig. 1a that an additional tabulating card automatically follows the tabulating card representing the debit item 0210 and this card represents a debit item of 0300. The entering of this item in the accumulator and the transfers effected during the entry cycle is also shown in Fig. 1a and at the end of the entry operation with the carries completed the units to the thousands order accumulator elements will be at 6, 7, 2 and 1 steps from normal and, of course, the readout representation will be 9, 8, 3, 4 from thousands to units order of the readout. The presence of a 9 in the thousands order signifies a negative balance and such order is tested prior to each total taking cycle and upon its occurrence a conversion cycle will be subsequently effected prior to the cycle for printing the negative credit balance as a true amount. It will also be assumed that upon the passage of the debit card 0300 a change in designation occurs so that a total will be taken after this entry.

As previously described, upon the change in group number designation relays R8, R21, R28 are energized to condition the machine for taking a total and also to stop card feeding operations.

In the latter part of the debit entry cycle in which the change of designation occurs the readout is tested for the presence of a 9 in the highest order by a circuit which extends from the line 310, through cam contacts CR45 to close at 306° after the entry, to the 9 digit segment 272 engaged by the brush 273 of the thousands order, the collector ring 274, brush 275, plug connection 400 to relay coil R89, relay contacts R28D now closed, cam contacts CR37 to ground, thus causing the energization of the pickup coil of relay R89. The circuit for causing the energization of the relay R28 was previously described in connection with the reset of the accumulator concurrent with total printing operations and it is explained that this relay is energized at the end of the cycle in which a change in designation occurs whether or not resetting operations occur. Pickup coil of relay R89 closes its contacts R89A, closing a circuit from the line 310 through cam contacts CR18 which are closed when the pickup coil of relay R89 is energized, contacts R89A to the hold coil of relay R89. Hold coil of relay R89 remains energized to the end of the entry cycle in which the change of designation occurs and also for a greater part of the next cycle which, in the present example, is a conversion cycle.

Relay R89 opens its safety contacts R89C to prevent cam contacts CR25 from sending unwanted impulses to relay R35 and which also might be directed by the plug connection 395 to print control magnets 61 during the next conversion cycle.

Relay R89 opens its contacts R89B to open the impulse circuit for transfers to prevent transfers from being effected during the conversion cycle. Relay R89 closes its contacts R89D, thus closing a circuit from the line 310, through cam contacts CR16, through relay contacts R89D to grounded relay R37. Cam contacts CR16 retain the energization of relay R37 during the entry part of the next or conversion cycle in the example now being assumed and transfers its contacts R37A-I thereby making a different relationship between the impulse distributor 390 and the segments 272 of the readout so that during the conversion cycle, in accordance with the digit representation of the readout, the impulse distributor causes impulses selected by the relay R37 to be transmitted to the type selecting magnets 61 to cause a different setting of the accumulator elements according to a predetermined plan.

Of course, during the conversion cycle the arbitrary entry utilized for the conversion is not to be printed and while the type selecting clutches are engaged to cause setting of the printing wheels in accordance with the selected digit impulses, printing is suppressed by reason of the fact that relay contacts R89C are open during the conversion cycle. This will open the impulse circuit which includes the cam contacts CR25 and prevent at the N time in the conversion cycle impulses from being directed to control magnets 61 to engage the printing clutches, and therefore printing in the conversion cycle will be suppressed.

At the beginning of the conversion cycle the accumulator control arms are latched and this is effected by a circuit which leads from line 310, cam contacts CR34, through relay contacts R28b now transferred, to plug socket 398, plug connection 397 which extends to the plug socket 330 thence by the interconnected plug connections 325 through contacts 333 now in the position shown, to the grounded control magnets 195. This circuit will effect the energization of control magnets 195 (Fig. 4a) at 354° of the machine cycle in which the change in designation occurs and in the manner previously described, all of the accumulator control arms 174 will be latched at the beginning of the conversion cycle.

When a positive credit balance exists the amount is represented as the true amount on the readout and therefore under such conditions no conversion is necessary. When a negative credit balance exists the amount which is represented on the readout is the nines complement of each digit representation of the negative balance as a true number. In printing a negative balance as a true number the nines complement of each digit representation of the readout is printed.

In Fig. 1a it will be noted that prior to conversion and after unit carries the negative credit balance is represented as 9834 on the readout, the test for 9 indicating a negative balance. In the subsequent cycle a conversion is made from the original accumulator representation to another representation which will cause the readout to represent the negative credit balance as a true number which will be printed. In accordance with the original representation on the readout prior to the conversion cycle 1, 3, 5, 7 and 9 digit impulses are selected by the relay R37, and accordingly the accumulator elements will be rotated one or more steps so that the associated readout will be at digit representing positions which represent the negative credit balance as a true figure. Conversion is made according to the following table:

| When Readout Represents— | Accumulator Represents— | Relay 37 Selects Conversion Impulse | Rotates Accumulator Wheel to— | So That Readout Represents— |
|---|---|---|---|---|
| 1 | 9 | 3 | 2 | 8 |
| 2 | 8 | 5 | 3 | 7 |
| 3 | 7 | 7 | 4 | 6 |
| 4 | 6 | 9 | 5 | 5 |
| 5 | 5 | 1 | 6 | 4 |
| 6 | 4 | 3 | 7 | 3 |
| 7 | 3 | 5 | 8 | 2 |
| 8 | 2 | 7 | 9 | 1 |
| 9 | 1 | 9 | 0 | 0 |
| 0 | 0 | 1 | 1 | 9 |

In the example assumed prior to the conversion cycle the readout represents 9834. According to the above table for the thousands order when the readout represents 9, a 9 impulse is transmitted by the impulse distributor to rotate the accumulator element nine steps so that the brush 273 will be in contact with the zero segment 272. For the hundreds order, in which the readout represents 8, the 7 impulse will be selected, rotating the accumulator element so that the brush 273 of the related readout order is in contact with the 1 segment 272. For the tens order, which now represents 3 on the readout, the 7 impulse will bring the brush of the related readout order to represent 6, and for the units order the readout representation is changed from 4 to 5 in accordance with the above table. The contacts R37A-I of the relay R37 are so wired to the segments 272 of the readout that the selected impulses will be transmitted by the impulse distributor according to the above table, these impulses being transmitted during the conversion cycle and are directed by the plug connection 387 to the type selecting control magnets 61. It will be recalled that prior to the conversion cycle all of the accumulator control arms 174 were latched. Upon engagement of the type selecting clutch each accumulator control arm will be unlatched at a differential time, thus rotating the accumulator wheel and the associated readout wheel 270 the predetermined steps.

After the conversion cycle the accumulator will represent 0945 and the associated readout will represent the tens complement of each digit or 0165 and a total printing cycle automatically follows and will take place in the manner previously described in connection with the printing of a positive credit balance.

As previously stated during the conversion cycle the impulse directed by cam contacts CR25 to the impulse circuit of the R35 relay is suppressed due to the previous opening of the R89C contacts. Hence, referring to Fig. 19a R35D contacts remain closed during the time that the CR51 cam contacts open during the conversion cycle. Hence, the latter maintains the R21 relay energized during the rest of the conversion cycle and during the subsequent total printing cycle which follows a conversion cycle up to about 260° of this total printing cycle when cam contacts CR51 open. Understanding now that relay contacts R21D are closed at the time the CR11 contacts close (Fig. 19a), the TM total switch magnet is energized. This conditions the machine for a total taking printing cycle following a conversion cycle.

The amount on the readout or 0165 will then be printed in the next cycle in the manner previously described to represent the negative credit balance as a true number.

Concurrent reset of the accumulator will take place in the manner previously described and after printing a negative credit balance as a true number the accumulator will be automatically cleared.

After printing of a balance, whether it is a positive or negative credit balance, card feeding operations automatically ensue in a manner which will now be described in detail.

*Automatic restart of card feeding operations*

During total printing cycles whether for positive or negative balances, cam contacts CR25 close at 225° to transmit the "N" impulse to the print control magnet 61 to engage the print clutches and effect total printing from the selected type. This same impulse is utilized to initiate card feeding operations to resume adding and subtracting operations under control of the next group of cards.

At the end of the previous conversion cycle, if any, cam contacts CR18 open to deenergize relay R89 and contacts R89C are therefore closed at 225° of the total printing cycle. At 225° of the total printing cycle relay coil R28 is still energized to keep its contacts R28E closed because cam contacts CR20 in the holding circuit of this relay do not open until about 270° of this cycle. At 225° of the total printing cycle a circuit is closed from line 310, cam contacts CR25, relay contacts R89C now closed, relay contacts R28E now closed, to the pickup coil of relay R35. The pickup coil of relay R35 closes its contacts R35B, thereby closing a circuit from line 310 through cam contacts CR19, through relay contacts R35B to the grounded hold coil of relay R35, providing a stick circuit for R35 until about 340° of the total printing cycle.

When relay coil R35 is energized, it opens its contacts R35C so that when cam contacts CR20 open at 268° of the total printing cycle relay coil R28 will be deenergized.

When relay R35 is energized it opens its contacts R35D so that when cam contacts CR51 open at 260° of the total printing cycle, relay coil R21 will be deenergized.

Deenergization of relay R21 will enable its contacts R21A (Fig. 19a) to close so that by virtue of the closing of such contacts cam contacts CR6 can transmit an impulse to the relay coil R11 near the end of the total printing cycle, causing relay R11 to close its contacts R11B to transmit an impulse to the card feed clutch control magnet 315 to automatically initiate card feeding operations after the termination of the total printing cycle, whether or not a preceding conversion cycle has taken place.

In the present machine the terms "debit" and "credit" are merely illustrative and their significance can be varied according to the bookkeeping system adopted, and should not be construed herein as definite limitations of the subject matter claimed.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine of the class described, the combination of a single balance accumulator comprising a plurality of uni-directionally rotatable accumulator wheels, means for analyzing credit and debit amount representations upon successive records, devices for sensing representations indicating whether said amount representations on the records represent debit or credit amounts, means under control of said analyzing means and said sensing devices for operating said accumulator wheels to enter therein the nines complement of each digit of the credit amount and for operating said accumulator wheels in the same direction to enter therein each natural digit of the debit amount, and units carry mechanism for each higher order wheel and operative in entering both credit and debit amounts when each lower order wheel passes from 0-1 to operate the next higher order wheel to carry a unit therein, said units carry mechanism including a units carry means and operative under control of and when the highest order wheel passes from 0-1 to operate the lowest order wheel to carry a unit therein, whereby said accumulator wheels manifest digits comprising a positive credit balance which, for each digit is the tens complement of the digit of the true balance number.

2. In combination, a plurality of wheels of a denominationally ordered accumulator and including for each order a digit readout means positionable by the related accumulator wheel to represent the tens complement of the digit representation therein, said accumulator including units carry mechanism operable under control of a lower order wheel when the latter passes from 0-1 to carry a unit to the next higher order wheel and further units carry mechanism comprising means operable under control of the highest order wheel when it passes from 0-1 to carry a unit to the lowest order wheel, entering means for entering the nines complement of the digits of amounts of one sign and true digits of amounts of another sign and including means to determine whether the nines complement or true digits are to be entered according to the sign of said amounts, said readout means representing after such entries a positive balance as a true number when amounts of one sign algebraically exceed the amounts of another sign and conversely said readout means representing a complemental negative balance, means to detect a complemental negative balance in said accumulator, conversion digit control means producing manifestations of different predetermined conversion digits such as to complement digits of a negative balance represented on the readout means to the true digits of a true number negative balance, and means rendered effective by the detecting means for selectively rendering the conversion digit control means effective and in accordance with the digit representation of each order of the readout means to control the entering means to enter in each accumulator wheel individually that conversion digit selected by the related order of the readout means required to manifest the negative balance number as a true number on said readout means.

3. In combination, a plurality of wheels of a denominationally ordered accumulator and including for each order a digit readout means directly positionable by the related accumulator wheel to represent the tens complement of the digit representation therein, units carry mechanism operable under control of a lower order wheel when the latter passes from 0-1 to carry a unit to the next higher order wheel, further units carry mechanism comprising means operable under control of the highest order wheel when it passes from 0-1 to carry a unit to the lowest order wheel, and entering means for entering the nines complement of the digits or amounts of the first sign and true digits of amounts of the second sign and including means to determine whether the nines complement or true digits are to be entered according to the signs of such amounts, said readout means representing after such entries a positive balance as a true number when amounts of the first sign numerically exceed amounts of the second sign and conversely said readout means representing the nines complement of the digits of the true number of a negative balance when amounts of the second sign numerically exceed the amounts of the first sign.

4. In combination, a plurality of wheels of a denominationally ordered accumulator and including for each order a digit readout means positionable by the related accumulator wheel to represent the tens complement of the digit representation therein, said accumulator including units carry mechanism operable under control of a lower order wheel when the latter passes from 0-1 to carry a unit to the next higher order wheel and further units carry mechanism comprising means operable under control of the highest order wheel when it passes from 0-1 to carry a unit to the lowest order wheel, entering means for entering the nines complement of the digits of amounts of one sign and true digits of amounts of another sign and including means to determine whether the nines complement or true digits are to be entered according to the sign of said amounts, said readout means representing after such entries a positive balance as a true number when amounts of said one sign numerically exceed the amounts of another sign and conversely said readout means representing a complemental negative balance when amounts of said other sign numerically exceed the amounts of said one sign, a digit impulse emitter associated with said readout means, means to effect an operation of said emitter to read out balance digit representations under control of said readout means, means to detect a complemental negative balance in said readout means, conversion digit control means for selecting from said emitter conversion digit impulses such as to complement digits of a negative balance represented complementally on the readout means to the true digits of a negative balance, means rendered effective by the detecting means for rendering said conversion digit control means effective for selecting under control of the readout means for each order and in accordance with the rigit representations of each order impulses to control said entering means to enter in each accumulator wheel individually that conversion digit selected by the related order of the readout means required to cause the readout means to represent the negative balance as a true number, and means operable after said conversion entering operation for causing the operation of said emitter to read out the true number negative balance digit representations under control of said readout means.

5. In a record controlled machine, record analyzing means, a drive shaft, a denominational order printing wheel carrying a plurality of groups of type, each group comprising alphabet type and numeral type and the numeral type occupying the same relative position in each group, a denominational order accumulator wheel associated with the printing wheel to receive entries of numerals printed by the printing wheel, a printing wheel clutch device intermediate the printing wheel and the drive shaft and means under control of the record analyzing means for operating said clutch to cause driving of the printing wheel when a first index point in a record column is analyzed, means under control of said analyzing means when a second index point in a record column is analyzed to cause said rotating printing wheel to print alphabet characters in accordance with the code represented by the two index points and means for causing said rotating printing wheel to print numeral characters in the absence of a second index point in a record column, an accumulator wheel clutch device for connecting the drive shaft with the accumulator wheel, means operated by the print wheel clutch device for operating the accumulator wheel clutch device, and means under control of the operator and operable in accordance with the operation of the machine for alphabet printing, or numeral accumulation and printing, for conditioning said last named means to be ineffective for alphabet printing and effective when numeral printing and accumulation are to be conjointly effected.

6. In an accounting machine, the combination of a plurality of wheels of a single balance accumulator in which amounts of two different signs are additively entered as true digits of an amount and complementally entered as the nines complement of an amount, readout means comprising for each order a series of digit segments and a settable element set by the related accumulator wheel to contact with a digit segment which is the tens complement of the digit representation of the related accumulator wheel, said readout means representing for one type of balance the digits of the true number balance, and for the other type of balance representing digits which are the nines complement of the digits of the true number balance, entering means for said accumulator, a single emitter for transmitting digit impulses 1-9 to corresponding digit segments of said readout means, means for detecting a nines complement digit representation of said readout means, means rendered effective by said last named means upon detecting said nines complement digit representation for causing the settable elements of said readout means to select conversion digit impulses 1, 3, 5, 7 or 9 from said emitter for transmission under control of said readout means to said entering means which cause said entering means to enter in each accumulator wheel individually a conversion digit which is required to cause said readout means to represent said other type of balance as a true number, and means for operatively associating said emitter with said settable elements for causing said settable elements of said readout means to select digit impulses 1-9 from said emitter corresponding to the digit representation of the readout means when the latter represents the true digits of the balance of either type for transmission under control of said readout means to control the manifestation of said balances as a true number.

7. In a perforated record controlled machine having a printing element for each order, an accumulator wheel of a denominationally ordered accumulator, means for analyzing said records, driving means for said wheel, means operable at the beginning of the entry part of the cycle to engage said wheel with said driving means to initiate a complement entry in said accumulator wheel, a clutch intermediate the printing element and said driving means, means under control of said analyzing means to engage the clutch at a differential time to initiate the movement of said printing element to select a type for printing corresponding to the true digit, and means operable as a result of the engagement of said clutch to disengage said accumulator wheel from said driving means at the differential time the movement of said printing element is initiated to thereby effect a complement entry in each order of the true digit printed in that order.

8. In a perforated record controlled machine having a printing element for each order, an accumulator wheel for each order, means for analyzing said records, driving means for said accumulator wheel, means operable at the beginning of the entry part of the cycle to engage said wheel with said driving means to initiate a complement entry in said accumulator wheel, means under control of said analyzing means to initiate at a differential time the movement of a printing element to select a type for printing corresponding to the true digit, and means controlled by said last named means to disengage said wheel from said driving means at the differential time the movement of the printing element is initiated to thereby terminate the complement entry in each order of the true digit printed in that order.

9. In a machine of the class described, the combination of an accumulator wheel, an accumulator wheel carrying support arm, driving means for said wheel, a latching member for said arm for holding the latter out of wheel driving position, an entry control member actuated at differential times having an operative connection to the support arm, and an operative connection to the latching member, bail means for enabling said arm when unlatched to be rocked to cause the accumulator wheel to be driven by said driving means to initiate a complement digit entry, and to be restored after having been rocked to terminate an additive digit entry, means to rock said latching member to latch said support arm prior to an entry part of the cycle, additive and subtractive control means, and means under control of said additive and subtractive control means to position said latching member when adding operations are to be effected to cause the latter when rocked to latch said support arm and to render inoperative the connection between said support arm and said entry control member, so that the operative connection between the latching member and said entry control member during the entry part of the cycle causes said entry control member when actuated at differential times to rock said latching member to unlatch said support arm to move said wheel to wheel driving position to initiate the additive entry, and when subtracting operations are to be effected to so position said latching member that when rocked it is ineffective to latch said support arm whereby the latter is rocked under control of said bail means to engage the wheel with the driving means to initiate the complement entry and the operative connection between said support arm and said entry control member causes the latter when actuated at differential times to restore the rocked support arm to terminate the complement entry.

10. In a perforated record controlled machine, an accumulator wheel, driving means for said machine, a support arm for said wheel, a latching member for said arm, having two different positions, bail means for enabling the movement of said arm if not latched to cause said wheel to be driven by said driving means at the beginning of the entry part of the cycle to enter a digit complementally and to restore said arm to terminate the driving of said wheels by the driving means after the additive digit entry, means for causing said latching member when in the first named position to be rocked to latch said arm whereby said bail means is ineffective to enable the movement of said arm to cause the wheels to be driven by the driving means at the beginning of the entry part of the cycle, entry control means operable at differential times during the entry part of the cycle, connecting means between said entry control means and said latching member, other connecting means controlled by said latching member between said entry control means and said support arm, and means to selectively effect the two different positions of said latching member, so that in one position thereof it is effective when rocked to latch said support arm at the beginning of a cycle and disable said other connecting means whereby the first named connecting means is effective to cause the latching means to be rocked by said entry control means at differential times to initiate an additive digit entry, and in the other position it is ineffective when rocked to latch the support arm to thereby enable said support arm to be rocked under control of said bail means to engage the wheel with the driving means to initiate a complement digit entry, whereby said entry control means through said other connecting means rocks said support arm to disengage said wheel at differential times to terminate the complement entry.

11. In a machine of the class described, the combination of an accumulator wheel, driving means therefor, means for moving said wheel at the beginning of a cycle to a position for rotation by said driving means to initiate a complement entry and to reversely move said wheel at the end of a cycle to terminate an additive entry, a latching member, means for rocking said latching member to hold said wheels from movement to wheel rotating position, entry control means actuated at differential times, operative connections between said latching member and said entry control means, means rendered operative by said entry control means to move said wheel out of wheel rotating position to terminate a complement entry, additive and subtractive control means, and means controlled thereby when adding operations are to be effected to enable said latching member to be rocked to latching position to prevent movement of said wheel to wheel rotating position at the beginning of the cycle and to enable said entry control means through said operative connections to rock said latching member at differential times to initiate a digit entry, and when subtracting operations are to be effected to prevent said latching member from being rocked to latching position to enable said moving means to move the wheel to wheel rotating position at the beginning of a cycle to initiate a complement entry and to enable said entry control means to effect, through said means rendered operative thereby, the movement of said wheel out of wheel rotating position at differential times to terminate the complement entry.

12. In a record controlled calculating machine, an accumulator wheel, driving means therefor, a rotatable printing wheel carrying digit type, a clutch to effect a connection between said driving means and the associated printing wheel, means operable at the beginning of an entry cycle to engage said wheel with said driving means to initiate a complement entry, record analyzing means, means controlled by said record analyzing means to effect the engagement of said clutch to connect said printing wheel to said driving means to rotate said wheel to a selected position to print the true digit, and means rendered operable by said clutch when engaged to concurrently move the associated accumulator wheel out of engagement with said driving means to terminate the complement entry of the digit printed in that order.

13. In a record controlled machine, record analyzing means, driving means, an accumulator wheel, a type carrying wheel of a corresponding denominational order, an accumulator wheel clutch device for connecting the accumulator wheel with said driving means, latching means for latching said clutch device to prevent said connection, a printing wheel clutch intermediate such printing wheel and the driving means, means under control of said record analyzing means for engaging said clutch to initiate the rotation of said printing wheel from a position of rest to a position to print a selected digit, and means operated by said print wheel clutch and upon engagement thereof to concurrently disable the latching means of the accumulator wheel clutch device of the same order to connect the corresponding accumulator wheel to the driving means to effect an entry corresponding to the digit printed.

14. In a record controlled accounting machine for selectively effecting in each order (1) numeral printing, or (2) conjoint numeral printing and entering, means for analyzing digit representing perforations on the record, a printing wheel having numeral type, a printing wheel clutch engaged in accordance with the perforations analyzed to effect the rotation of the printing wheel to select a numeral type, control means to effect the engagement of said printing clutch, an accumulator wheel to receive numeral entries, devices under control of said printing clutch and operable as a result of its engagement to initiate the operation of the associated accumulator wheel to enter a numeral according to the perforation analyzed, means to effect printing from the selected numeral type, means to cause said control means to be responsive to said record analyzing means upon analyzing said digit representing perforations for selecting the numeral type, and further means under control of the operator and operable in accordance with the operation for numeral printing alone, or conjoint numeral printing and entering for rendering said devices ineffective for numeral printing alone, or effective for conjoint numeral printing and entering.

15. In a record controlled accounting machine for effecting in each order conjoint numeral printing and entering, means for analyzing digit representing perforations on the record, a printing wheel having numeral type, a printing wheel clutch engaged in accordance with the perforations analyzed to effect the rotation of the printing wheel to select a numeral type, control means to effect the engagement of said printing clutch, an accumulator wheel associated with said printing wheel to receive numeral entries, devices under control of said printing clutch and operable as a result of its engagement to initiate the operation of the associated accumulator wheel to enter a numeral according to the perforation analyzed, means to effect printing from the selected numeral type, and means to cause said control means to be responsive to said record analyzing means upon analyzing said digit representing perforations for effecting the engagement of the printing clutch.

16. In a perforated record controlled machine having a printing element, an accumulator wheel, means for analyzing said records, driving means, means for clutching said wheel with said driving means and declutching said wheel from said driving means, said means acting to clutch said wheel with said driving means at the beginning of the entry part of the cycle and declutching said wheel from said driving means at the termination of the digit entry, devices operable prior to the entry part of the cycle to prevent said clutching means from acting to clutch the wheel with said driving means, a clutch intermediate the printing element and said driving means and engaged to initiate the movement of said printing element to select a type for printing corresponding to the digit entry in the accumulator wheel, means under control of said analyzing means to engage the printing type selecting clutch with said driving means at a differential time, cam means operable as a result of the engagement of said printing type selecting clutch, and mechanical means connecting said cam means and said devices to disable the devices which prevent the clutching means from acting to clutch the accumulator wheel with the driving means to cause the accumulator wheel to be clutched to said driving means at a differential time to enter a digit therein.

17. In a perforated record controlled machine having a printing element, an accumulator wheel, means for analyzing said records, driving means, a support arm for said wheel and movable to cause the wheel to be driven by said driving means, bail means operable at the beginning of the entry part of the cycle to enable said arm to be moved to a wheel driving position to initiate a complement entry in the accumulator wheel, a clutch intermediate the printing element and said driving means and engaged to initiate the movement of said printing element to select a type for printing corresponding to the true digit of the complement entry in the accumulator wheel, cam means operable as a result of the engagement of said clutch, means under control of said analyzing means to engage the printing type selecting clutch at a differential time to operate said cam means, and mechanical means operatively connecting said cam means and said support arm for causing when the cam means is operated the rocking of the related arm from its wheel driving position to thereby terminate the driving of the accumulator wheel and effect a complement entry of the true digit printed.

18. In an accounting machine, an accumulator wheel, driving means therefor, a support arm for said accumulator wheel, bail means operable to cause the movement of said arm to engage the wheel with said driving means, a control member for said arm and having two positions, electromagnetic means to latch said control member in either of said positions, a latching member for said support arm and having an operative connection to the associated control member, a bail member operatively holding said latching member and operable prior to the entry part of the cycle to move said latching member to latch said arm when said control member is moving to be latched in its second position, said control member when latched in its first position holding said latching member in a position where it is ineffective to latch said arm when said bail member is operated, means for controlling the movement of said control member for setting said control member to either of said latching positions, electrical means to transmit impulses timed with the operation of said last named means to cause said electromagnetic means to latch the control member in the desired positions, and entry control means each maving an operative connection to the related latching member and the support arm and operable at differential times and when the control member is in said second position to cause said latching member to be unlatched from the support arm to engage the accumulator wheel with said driving means, and when said control member is in its first position to move said support arm to disengage the associated wheel from said driving means.

19. In a machine of the class described, the combination of an accumulator wheel, an accumulator wheel support arm, a bail for enabling the rocking of said arm to wheel driving position, a latching member for said arm, a pivoted control member to which said latching member is pivoted, means for rocking said control member and simultaneously shifting said latching member to latching position, resilient rocking means for rocking said latching member, while being shifted to latch said accumulator wheel support arm, other means for preventing the operation of said means for rocking said control member to thereby retain said latching member in nonshifted position, said resilient means when rocked then taking up its movement when the latching member abuts said arm to prevent the latching of said support arm by said latching member, whereby the support arm is free to follow the movement of said bail to wheel driving position.

20. In a record controlled machine, record analyzing means, a drive shaft, a type carrying printing wheel, an accumulator wheel for a corresponding denominational order, a print wheel clutch device intermediate said printing wheel and the drive shaft, means under control of the record analyzing means for operating said clutch to cause the rotation of said printing wheel from a position of rest to a position to select a digit type for printing, an accumulator wheel clutch device for connecting the drive shaft and said accumulator wheel, and means controlled by said print wheel clutch device, when operated to cause the rotation of the printing wheel to a type selecting position, to cause the operation of the clutch device of the associated accumulator wheel to enter a digit corresponding to the digit to be printed.

21. In a record controlled machine, record analyzing means, a drive shaft, a type carrying printing wheel, an accumulator wheel for a corresponding denominational order, a print wheel clutch device intermediate said printing wheel and the drive shaft for coupling a gear train including said printing wheel to the drive shaft to cause the rotation of said printing wheel, means under control of the record analyzing means for operating said clutch device to initiate the rotation of said printing wheel from a position of rest to a position for printing from a selected digit, an accumulator wheel clutch device for connecting the associated accumulator wheel with the drive shaft, a rockable lever for operating said accumulator wheel clutch device, and a cam rotatable with one of the gears of said gear train cooperating with said lever to rock it to operate said accumulator wheel clutch device upon rotation of said gear train to connect the associated accumulator wheel and the drive shaft to initiate a digit entry into said accumulator wheel at the time the rotation of the printing wheel is initiated to thereby insure the entering of a digit in the accumulator wheel corresponding to the digit printed.

22. In a record controlled machine, record analyzing means, a drive shaft, a type carrying printing wheel, an accumulator wheel of corresponding denominational order, a printing wheel clutch device intermediate said printing wheel and the drive shaft for effecting the rotation of said printing wheel, means under control of the analyzing means for operating said clutch device to initiate the rotation of said printing wheel to a position for printing from a selected digit, an accumulator wheel clutch device for connecting the accumulator wheel with the drive shaft to rotate said accumulator wheel, and means controlled by the printing wheel clutch device to concurrently operate the accumulator wheel clutch device to cause a digit entry corresponding to the selected digit printed.

23. In a record controlled accounting machine for selectively effecting either (1) alphabet printing or (2) conjoint numeral printing and entering, record analyzing means for analyzing records having perforations representing either numerical data or alphabetical data, a printing wheel carrying groups of alphabet type and a numeral type in each group, an accumulator wheel to receive numeral entries, alphabet and numeral type selecting means comprising means controlled by said analyzing means upon analyzing certain perforations in a record to initiate and effect the rotation of said printing wheel to select from said printing wheel a group of alphabet type or a numeral type in the selected group, means to effect printing from the selected numeral and alphabet type, alphabet type selecting means comprising supplemental means controlled by said analyzing means upon analyzing other perforations in a record to effect the operation of said printing effecting means to cause printing from the selected alphabet type of the selected group, means to cause the operation of the printing effecting means to effect printing from the selected numeral type of the selected group, a device controlled by said initiating means and operable as a result of the rotation of said printing wheel to effect the numeral entering operation of the accumulator wheel, and means operable in accordance with the operation of the machine for alphabet printing for rendering said device ineffective, and operable in accordance with the operation of the machine for conjoint numeral printing and entering for rendering said device effective.

24. In a record controlled accounting machine for selectively effecting in each order either (1) alphabet printing or (2) conjoint numeral printing and entering, record analyzing means for analyzing records having perforations representing either numerical data or alphabetical data, a printing wheel carrying groups of alphabet type and a numeral type in each group, an accumulator wheel to receive numeral entries, alphabet and numeral type selecting means comprising means controlled by said analyzing means upon analyzing certain perforations in a record to initiate and effect the rotation of said printing wheel to select from said printing wheel a group of alphabet type or a numeral type in the selected group, means to effect printing from the selected alphabet and numeral type, alphabet type selecting means comprising supplemental means controlled by said analyzing means upon analyzing other perforations in a record to cause the operation of the printing means to effect printing from the selected alphabet type of the selected group, means to cause the operation of the printing means to effect printing from the selected numeral type of the selected group, a device controlled by said initiating means to effect the numeral entering operation of the accumulator wheel, and means under control of the operator and operable in accordance with the operation of the machine for alphabet printing or conjoint numeral printing and entering for rendering said device ineffective for alphabet printing and said device effective when conjoint numeral printing and entering are to be effected.

25. In a record controlled machine, a printing wheel having digit type, a printing wheel clutch which is engaged at a differential time to initiate the rotation of said printing wheel to select a digit type for total printing, printing means operable to print from said printing wheel when said wheel is at a total digit representing position, an accumulator wheel and a total digit readout settable under control of said accumulator wheel, means under control of said clutch and operable as a result of its engagement to initiate the rotation of said accumulator wheel and set said readout from its total digit representing position to zero position concurrent with the rotation of said printing wheel to total digit representing position under control of said readout, and means for reading out the digit representations of said readout to effect, as said digit representations are read out, the engagement of said printing clutch at differential times to initiate the rotation of said printing wheel to a corresponding total digit representing position.

26. In a record controlled accounting machine for selectively effecting in each order (1) alphabet printing, or (2) numeral printing with or without numeral entering, record analyzing means for analyzing 1-9 and 0, X, R perforations, a printing wheel having a plurality of groups of type, each group comprising alphabet and numeral type, a printing wheel clutch engaged when perforations 1-9 are analyzed to rotate the printing wheel to select a group of alphabet type and numeral type, a control means to effect the engagement of the printing clutch, an accumulator wheel to receive numeral entries, a device under control of the printing wheel clutch and operable as a result of its engagement to initiate the operation of the accumulator wheel to enter a numeral according to the 1-9 perforation analyzed, means to effect printing from the selected numeral or alphabet type, means under control of said record analyzing means upon analyzing the 0, X, R perforations to cause the operation of said printing effecting means at differential times dependent upon the 0, X, R perforation analyzed to effect printing from the alphabet type selected by the 0, X, R perforation analyzed, means to cause the operation of said printing effecting means at another time to effect printing from the selected numeral type of the selected group, means connectable by the operator with said record analyzing means and associated with said control means for rendering said control means responsive to 1-9 perforations for selecting a group of alphabet and numeral type, other means associated with said means to cause the operation of the printing effecting means at differential times and connectable by the operator with said record analyzing means for rendering said means responsive to said 0, X, R perforations, and means under control of the operator and operable in accordance with the conditioning of the machine for alphabet or numerical printing and entering for rendering said device ineffective for alphabet printing and effective when numeral printing and entering are to be conjointly effected.

27. In a record controlled accounting machine for selectively effecting in each order (1) alphabet printing, or (2) numeral printing with or without numeral entering, record analyzing means for analyzing 1-9 and 0, X, R perforations, a printing wheel having a plurality of groups of type, each group comprising alphabet and numeral type, a printing wheel clutch engaged when perforations 1-9 are analyzed to rotate the printing wheel to select a group of alphabet type and numeral type, a control means to effect the engagement of the printing wheel clutch, an accumulator wheel to receive numeral entries, a device under control of the printing wheel clutch and operable as a result of its engagement to initiate the operation of the accumulator wheel to enter a numeral according to the 1-9 perforation analyzed, means to effect printing from the selected numeral or alphabet type, means under control of said record analyzing means upon analyzing the 0, X, R perforations to cause the operation of said printing effecting means at differential times dependent upon the 0, X, R perforation analyzed to effect printing from the alphabet type selected by the 0, X, R perforation analyzed, means to cause the operation of said printing effecting means at another time to effect printing from the selected numeral type of the selected group, means connectable by the operator with said record analyzing means and associated with said control means for rendering said control means responsive to 1-9 perforations for selecting a group of alphabet and numeral type, other means associated with said means to cause the operation of the printing effecting means at differential times and connectable by the operator with said record analyzing means for rendering said means responsive to said 0, X, R perforations, means operable to prevent the effective operation of said device to prevent numeral entries in the accumulator wheel when the printing wheel is utilized for alphabet printing, and means under control of the operator and rendered effective when numeral entering is effected to render the corresponding preceding means ineffective whereby said device is effective to cause accumulator entries.

28. In a record controlled accounting machine for selectively effecting in each order (1) alphabet printing, or (2) numeral printing and true digit or complement numeral entering, record analyzing means for analyzing 1-9 and 0, X, R perforations, a printing wheel having a plurality of groups of type, each group comprising alphabet and numeral type, a printing wheel clutch engaged when perforations 1-9 are analyzed to rotate the printing wheel to select a group of alphabet type and numeral type, control means to effect the engagement of said printing wheel clutch, an accumulator wheel to receive numeral entries, a device under control of the printing wheel clutch and operable as a result of its engagement to initiate the operation of the accumulator wheel to enter a numeral according to the 1-9 perforation analyzed or to terminate the complement entry in the accumulator wheel, means to effect printing from the selected numeral or alphabet type, means under control of said record analyzing means upon analyzing the 0, X, R perforations to cause the operation of said printing effecting means at differential times dependent upon the 0, X, R perforation analyzed to effect printing from the alphabet type selected by the 0, X, R perforation analyzed, means to cause the operation of said printing effecting means at another time to effect printing from the selected numeral type of the selected group, means connectable by the operator with said record analyzing means and associated with said control means for rendering said control means responsive to 1-9 perforations for selecting a group of alphabet and numeral type, other means associated with said means to cause the operation of the printing effecting means at differential times and connectable by the operator with said record analyzing means for rendering said means responsive to said 0, X, R perforations, and means under control of the operator and operable in accordance with the conditioning of the machine for alphabet or numeral entering for rendering said device ineffective for alphabet printing, and effective when numeral printing and true digit and complement entering are to be effected.

29. In a record controlled accounting machine for selectitvely effecting in each order (1) alphabet printing, or (2) numeral printing and entering, record analyzing means for analyzing 1–9 and 0, X, R perforations, a printing wheel having a plurality of groups of type, each group comprising alphabet and numeral type, a printing wheel clutch engaged when perforations 1–9 are analyzed to rotate the printing wheel to select a group of alphabet type and numeral type, a control means to effect the engagement of the printing clutch, an accumulator wheel to receive numeral entries, a device under control of the printing wheel clutch and operable as a result of its engagement to initiate the operation of the accumulator wheel to enter a numeral according to the 1–9 perforation analyzed, means to effect printing from the selected numeral or alphabet type, means under control of said record analyzing means upon analyzing the 0, X, R perforations to cause the operation of said printing effecting means at differential times dependent upon the 0, X, R perforation analyzed to effect printing from the alphabet type selected by the 0, X, R perforation analyzed, means connectable by the operator to said printing effecting means to cause operation thereof at another time to effect printing from the selected numeral type of the selected group, means connectable by the operator with said record analyzing means and associated with said control means for rendering said control means responsive to 1–9 perforations for selecting a group of alphabet and numeral type, other means associated with said means to cause the operation of the printing effecting means at differential times and connectable by the operator with said record analyzing means for rendering said means responsive to said 0, X, R perforations when alphabet printing is to be effected.

30. In a record controlled machine, record analyzing means, a drive shaft, a printing wheel, an accumulator wheel of corresponding denominational order, a print wheel clutch device intermediate said printing wheel and the drive shaft, means under control of the record analyzing means for operating said clutch to cause the rotation of the printing wheel from a position of rest to a position to select a type for printing, an accumulator wheel clutch device for connecting the accumulator wheel and drive shaft, and mechanical means operated by said print wheel clutch when operated to cause the rotation of said printing wheel to a type selecting position to cause the operation of the clutch device of the associated accumulator wheel to enter a digit corresponding to the digit to be printed.

31. In a record controlled machine, record analyzing means for analyzing perforations representing digits, a drive shaft, a printing wheel, an accumulator wheel of corresponding denominational order, a print wheel clutch device intermediate said drive shaft and printing wheel, an accumulator clutch device intermediate said drive shaft and accumulator wheel, means under control of the record analyzing means for operating one of said clutches to connect the related wheel with said drive shaft to rotate said wheel an extent commensurate with the digit represented by the digit representing perforation analyzed, and means controlled by said operated clutch to cause the operation of the other clutch device to cause said other wheel to be connected to said drive shaft to be concurrently rotated to an extent commensurate with the digit represented by the digit representing perforation analyzed.

THOMAS J. WATSON.
HORACE S. BEATTIE.
SCHUYLER B. HARRISON,
JOHN G. PHILLIPS,
*Executors of the Estate of Frederick L. Fuller, Deceased.*

REFERENCES CITED

The following references are of record in the file of this patent:

UNITED STATES PATENTS

| Number | Name | Date |
|---|---|---|
| 1,875,849 | Carroll | Sept. 6, 1932 |
| 2,007,375 | Lake et al. | July 9, 1935 |
| 2,016,704 | Bryce | Oct. 8, 1935 |
| 2,124,177 | Lasker et al. | July 19, 1938 |
| 2,126,621 | Daly | Aug. 9, 1938 |
| 2,131,226 | Kolm | Sept. 27, 1938 |
| 2,185,260 | Lasker | Jan. 2, 1940 |
| 2,199,561 | Fuller et al. | May 7, 1940 |
| 2,244,241 | Bryce | June 3, 1941 |
| 2,340,772 | Rubidge et al. | Feb. 1, 1944 |